US009412413B2

(12) United States Patent
Martch

(10) Patent No.: US 9,412,413 B2
(45) Date of Patent: Aug. 9, 2016

(54) ELECTRONIC PROGRAMMING GUIDE

(71) Applicant: Echostar Technologies, LLC, Englewood, CO (US)

(72) Inventor: Henry Gregg Martch, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 360 days.

(21) Appl. No.: 13/801,968

(22) Filed: Mar. 13, 2013

(65) Prior Publication Data

US 2013/0243403 A1     Sep. 19, 2013

Related U.S. Application Data

(60) Provisional application No. 61/611,483, filed on Mar. 15, 2012.

(51) Int. Cl.
*H04N 5/76*     (2006.01)
*G11B 27/026*   (2006.01)
*H04N 5/91*     (2006.01)
(Continued)

(52) U.S. Cl.
CPC .............. *G11B 27/026* (2013.01); *G11B 27/28* (2013.01); *H04N 5/4401* (2013.01); *H04N 5/50* (2013.01); *H04N 5/76* (2013.01); *H04N 5/775* (2013.01); *H04N 5/782* (2013.01); *H04N 5/91* (2013.01); *H04N 9/79* (2013.01); *H04N 9/797* (2013.01); *H04N 9/87* (2013.01); *H04N 21/4147* (2013.01); *H04N 21/4263* (2013.01); *H04N 21/4302* (2013.01); *H04N 21/4334* (2013.01); *H04N 21/4335* (2013.01); *H04N 21/4583* (2013.01); *H04N 21/4755* (2013.01); *H04N 21/47214* (2013.01); *H04N 21/47217* (2013.01); *H04N 21/482* (2013.01); *H04N 7/20* (2013.01); *H04N 21/4826* (2013.01)

(58) Field of Classification Search
None
See application file for complete search history.

(56) References Cited

U.S. PATENT DOCUMENTS 4,706,121 A   11/1987   Young
4,723,246 A    2/1988   Weldon, Jr.
(Continued)

FOREIGN PATENT DOCUMENTS

CN     101202600 A    6/2008
CN     101310532 A   11/2008
(Continued)

OTHER PUBLICATIONS

International Search Report and Written Opinion of PCT/US2013/32176 mailed on Jun. 25, 2013, 15 pages.
(Continued)

*Primary Examiner* — Heather Jones
(74) *Attorney, Agent, or Firm* — Kilpatrick Townsend & Stockton LLP

(57) ABSTRACT

A first program recording timer may be scheduled to record a particular program broadcast on a particular television channel by a television service provider. A second program recording timer may be scheduled to record a plurality of programs broadcast consecutively on the particular television channel by the television service provider, including the particular program. A first graphical indicator that identifies scheduling of the first program recording timer, and a second graphical indicator that identifies scheduling of the second program recording timer may be simultaneously output for display within a programming guide and in association with a descriptor of the particular program.

20 Claims, 14 Drawing Sheets

(51) Int. Cl.

| | | |
|---|---|---|
| *H04N 5/50* | (2006.01) | |
| *H04N 9/87* | (2006.01) | |
| *H04N 9/79* | (2006.01) | |
| *H04N 21/472* | (2011.01) | |
| *H04N 9/797* | (2006.01) | |
| *H04N 5/782* | (2006.01) | |
| *H04N 21/426* | (2011.01) | |
| *H04N 21/433* | (2011.01) | |
| *H04N 5/44* | (2011.01) | |
| *G11B 27/28* | (2006.01) | |
| *H04N 21/4147* | (2011.01) | |
| *H04N 21/43* | (2011.01) | |
| *H04N 21/458* | (2011.01) | |
| *H04N 5/775* | (2006.01) | |
| *H04N 21/4335* | (2011.01) | |
| *H04N 21/475* | (2011.01) | |
| *H04N 21/482* | (2011.01) | |
| *H04N 7/20* | (2006.01) | |

(56) References Cited

U.S. PATENT DOCUMENTS

| | | |
|---|---|---|
| 4,802,215 A | 1/1989 | Mason |
| 5,187,589 A | 2/1993 | Kono et al. |
| 5,335,277 A | 8/1994 | Harvey et al. |
| 5,483,277 A | 1/1996 | Granger |
| 5,488,658 A | 1/1996 | Hirashima |
| 5,541,738 A | 7/1996 | Mankovitz |
| 5,642,153 A | 6/1997 | Chaney et al. |
| 5,682,597 A | 10/1997 | Ganek et al. |
| 5,684,969 A | 11/1997 | Ishida |
| 5,724,646 A | 3/1998 | Ganek et al. |
| 5,805,763 A | 9/1998 | Lawler et al. |
| 5,974,218 A | 10/1999 | Nagasaka et al. |
| 6,049,333 A | 4/2000 | LaJoie et al. |
| 6,263,504 B1 | 7/2001 | Ebisawa |
| 6,453,115 B1 | 9/2002 | Boyle |
| 6,628,891 B1 | 9/2003 | Vantalon et al. |
| 6,701,528 B1 | 3/2004 | Arsenault et al. |
| 6,766,523 B2 | 7/2004 | Herley |
| 6,798,971 B2 | 9/2004 | Potrebic |
| 6,938,208 B2 | 8/2005 | Reichardt |
| 7,024,676 B1 | 4/2006 | Klopfenstein |
| 7,409,140 B2 | 8/2008 | Rodriguez et al. |
| 7,487,529 B1 | 2/2009 | Orlick |
| 7,490,169 B1 | 2/2009 | Ogdon et al. |
| 7,493,312 B2 | 2/2009 | Liu et al. |
| 7,505,081 B2 | 3/2009 | Eshleman |
| 7,542,656 B2 | 6/2009 | Cho et al. |
| 7,577,751 B2 | 8/2009 | Vinson et al. |
| 7,590,993 B1 | 9/2009 | Hendricks et al. |
| 7,684,672 B2 | 3/2010 | Matoba |
| 7,715,552 B2 | 5/2010 | Pinder et al. |
| 7,730,517 B1 | 6/2010 | Rey et al. |
| 7,739,711 B2 | 6/2010 | Finseth et al. |
| 7,760,986 B2 | 7/2010 | Beuque |
| 7,804,861 B2 | 9/2010 | Kim |
| 7,848,618 B2 | 12/2010 | Potrebic et al. |
| 7,856,557 B2 | 12/2010 | Beuque |
| 7,926,078 B2 | 4/2011 | Arsenault et al. |
| 7,929,697 B2 | 4/2011 | McNeely et al. |
| 7,962,937 B2 | 6/2011 | Cho et al. |
| 8,006,268 B2 | 8/2011 | Sloo |
| 8,201,194 B2 | 6/2012 | Wijnands et al. |
| 8,321,466 B2 | 11/2012 | Black et al. |
| 8,364,671 B1 | 1/2013 | Sinton et al. |
| 8,437,622 B2 | 5/2013 | Casagrande |
| 8,447,170 B2 | 5/2013 | Casagrande |
| 8,566,873 B2 | 10/2013 | Sie et al. |
| 8,584,167 B2 | 11/2013 | Vanduyn |
| 8,606,088 B2 | 12/2013 | Kummer et al. |
| 8,627,349 B2 | 1/2014 | Kirby et al. |
| 8,660,412 B2 | 2/2014 | Kummer et al. |
| 8,763,027 B2 | 6/2014 | Martch |
| 8,774,608 B2 | 7/2014 | Kummer et al. |
| 8,819,722 B2 | 8/2014 | Kummer et al. |
| 8,819,761 B2 | 8/2014 | Minnick |
| 8,850,476 B2 | 9/2014 | VanDuyn et al. |
| 8,867,893 B2 | 10/2014 | Kirby |
| 8,959,544 B2 | 2/2015 | Kummer et al. |
| 8,959,566 B2 | 2/2015 | Kummer |
| 8,989,562 B2 | 3/2015 | Kummer et al. |
| 8,997,153 B2 | 3/2015 | Templeman |
| 9,031,385 B2 | 5/2015 | Casagrande et al. |
| 9,043,843 B2 | 5/2015 | Templeman et al. |
| 9,055,274 B2 | 6/2015 | Casagrande |
| 9,088,763 B2 | 7/2015 | Martch et al. |
| 9,113,222 B2 | 8/2015 | VanDuyn |
| 9,177,605 B2 | 11/2015 | Minnick et al. |
| 9,177,606 B2 | 11/2015 | Kirby |
| 9,185,331 B2 | 11/2015 | Martch et al. |
| 9,191,694 B2 | 11/2015 | Casagrande |
| 9,202,524 B2 | 12/2015 | Martch et al. |
| 9,264,779 B2 | 2/2016 | Kirby et al. |
| 9,269,397 B2 | 2/2016 | Casagrande et al. |
| 2001/0028782 A1 | 10/2001 | Ohno et al. |
| 2001/0033736 A1 | 10/2001 | Yap et al. |
| 2001/0034787 A1 | 10/2001 | Takao et al. |
| 2002/0044658 A1 | 4/2002 | Wasilewski et al. |
| 2002/0054752 A1 | 5/2002 | Wood et al. |
| 2002/0055343 A1 | 5/2002 | Stetzler et al. |
| 2002/0087979 A1 | 7/2002 | Dudkiewicz et al. |
| 2002/0087983 A1 | 7/2002 | Son et al. |
| 2002/0092021 A1 | 7/2002 | Yap et al. |
| 2002/0095510 A1 | 7/2002 | Sie et al. |
| 2002/0097340 A1 | 7/2002 | Takagi et al. |
| 2002/0116705 A1 | 8/2002 | Perlman |
| 2002/0120925 A1 | 8/2002 | Logan |
| 2002/0126221 A1 | 9/2002 | Link |
| 2002/0141431 A1 | 10/2002 | Tripathy |
| 2002/0144259 A1 | 10/2002 | Srinivas et al. |
| 2002/0144266 A1 | 10/2002 | Goldman et al. |
| 2002/0152299 A1 | 10/2002 | Traversat et al. |
| 2002/0164147 A1 | 11/2002 | Suda |
| 2002/0168178 A1 | 11/2002 | Rodriguez et al. |
| 2002/0174430 A1 | 11/2002 | Ellis et al. |
| 2002/0184638 A1 | 12/2002 | Agnihotri et al. |
| 2002/0188943 A1 | 12/2002 | Freeman et al. |
| 2003/0005454 A1 | 1/2003 | Rodriguez et al. |
| 2003/0026423 A1 | 2/2003 | Unger et al. |
| 2003/0078930 A1 | 4/2003 | Surcouf et al. |
| 2003/0097659 A1 | 5/2003 | Goldman |
| 2003/0110514 A1 | 6/2003 | West et al. |
| 2003/0149988 A1 | 8/2003 | Ellis et al. |
| 2003/0152360 A1 | 8/2003 | Mukai et al. |
| 2003/0156826 A1 | 8/2003 | Sonoda et al. |
| 2003/0177492 A1 | 9/2003 | Kanou |
| 2003/0177495 A1 | 9/2003 | Needham et al. |
| 2003/0200548 A1 | 10/2003 | Baran et al. |
| 2003/0208763 A1 | 11/2003 | McElhatten et al. |
| 2003/0208767 A1 | 11/2003 | Williamson et al. |
| 2003/0226150 A1 | 12/2003 | Berberet et al. |
| 2004/0001087 A1 | 1/2004 | Warmus et al. |
| 2004/0003118 A1 | 1/2004 | Brown et al. |
| 2004/0015992 A1 | 1/2004 | Hasegawa et al. |
| 2004/0015999 A1 | 1/2004 | Carlucci et al. |
| 2004/0078829 A1 | 4/2004 | Patel et al. |
| 2004/0080672 A1 | 4/2004 | Kessler et al. |
| 2004/0103428 A1 | 5/2004 | Seok et al. |
| 2004/0128682 A1 | 7/2004 | Liga et al. |
| 2004/0133923 A1 | 7/2004 | Watson et al. |
| 2004/0162871 A1 | 8/2004 | Pabla et al. |
| 2004/0218905 A1 | 11/2004 | Green et al. |
| 2004/0242150 A1 | 12/2004 | Wright et al. |
| 2004/0268387 A1 | 12/2004 | Wendling |
| 2005/0002640 A1 | 1/2005 | Putterman |
| 2005/0034171 A1 | 2/2005 | Benya |
| 2005/0083865 A1 | 4/2005 | Ashley et al. |
| 2005/0120049 A1 | 6/2005 | Kanegae et al. |
| 2005/0125683 A1 | 6/2005 | Matsuyama et al. |
| 2005/0147383 A1 | 7/2005 | Ihara |
| 2005/0180568 A1 | 8/2005 | Krause |

(56) References Cited

U.S. PATENT DOCUMENTS

| | | |
|---|---|---|
| 2005/0229213 A1 | 10/2005 | Ellis et al. |
| 2005/0237435 A1 | 10/2005 | Potrebic et al. |
| 2005/0271365 A1 | 12/2005 | Hisatomi |
| 2005/0273819 A1 | 12/2005 | Knudson et al. |
| 2005/0281531 A1 | 12/2005 | Unmehopa |
| 2006/0010464 A1 | 1/2006 | Azami |
| 2006/0020962 A1 | 1/2006 | Stark et al. |
| 2006/0056800 A1 | 3/2006 | Shimagami et al. |
| 2006/0075434 A1 | 4/2006 | Chaney et al. |
| 2006/0080716 A1 | 4/2006 | Nishikawa et al. |
| 2006/0085828 A1 | 4/2006 | Dureau et al. |
| 2006/0206819 A1 | 9/2006 | Tsuji et al. |
| 2006/0212900 A1 | 9/2006 | Ismail et al. |
| 2006/0215993 A1 | 9/2006 | Yamada |
| 2006/0257099 A1 | 11/2006 | Potrebic et al. |
| 2006/0274208 A1 | 12/2006 | Pedlow, Jr. |
| 2007/0016546 A1 | 1/2007 | De Vorchik et al. |
| 2007/0039032 A1 | 2/2007 | Goldey et al. |
| 2007/0061378 A1 | 3/2007 | Lee et al. |
| 2007/0154163 A1 | 7/2007 | Cordray |
| 2007/0157248 A1 | 7/2007 | Ellis |
| 2007/0157253 A1 | 7/2007 | Ellis et al. |
| 2007/0165855 A1 | 7/2007 | Inui |
| 2007/0183745 A1 | 8/2007 | White |
| 2007/0192586 A1 | 8/2007 | McNeely |
| 2007/0204288 A1 | 8/2007 | Candelore |
| 2007/0234395 A1 | 10/2007 | Dureau et al. |
| 2007/0250856 A1 | 10/2007 | Leavens et al. |
| 2007/0258596 A1 | 11/2007 | Kahn et al. |
| 2008/0022347 A1 | 1/2008 | Cohen |
| 2008/0044158 A1 | 2/2008 | Kido |
| 2008/0046929 A1 | 2/2008 | Cho et al. |
| 2008/0052743 A1* | 2/2008 | Moore ............................ 725/46 |
| 2008/0074547 A1 | 3/2008 | Ida |
| 2008/0092164 A1 | 4/2008 | Agarwal et al. |
| 2008/0092181 A1 | 4/2008 | Britt |
| 2008/0101760 A1* | 5/2008 | Waller ............................ 386/40 |
| 2008/0104534 A1 | 5/2008 | Park et al. |
| 2008/0127253 A1 | 5/2008 | Zhang et al. |
| 2008/0137850 A1 | 6/2008 | Mamidwar |
| 2008/0141322 A1 | 6/2008 | Jang et al. |
| 2008/0144747 A1 | 6/2008 | Tomizawa |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1 | 9/2008 | Pfeffer et al. |
| 2008/0222678 A1 | 9/2008 | Burke et al. |
| 2008/0222681 A1 | 9/2008 | Kwon |
| 2008/0271077 A1 | 10/2008 | Kim et al. |
| 2008/0273698 A1 | 11/2008 | Manders et al. |
| 2008/0273856 A1 | 11/2008 | Bumgardner |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0301740 A1 | 12/2008 | Tsutsui |
| 2008/0307217 A1 | 12/2008 | Yukimatsu et al. |
| 2009/0025027 A1 | 1/2009 | Craner |
| 2009/0051579 A1 | 2/2009 | Inaba et al. |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0110367 A1 | 4/2009 | Fukui |
| 2009/0129741 A1 | 5/2009 | Kim |
| 2009/0129749 A1 | 5/2009 | Oyamatsu et al. |
| 2009/0136206 A1 | 5/2009 | Aisu |
| 2009/0150941 A1 | 6/2009 | Riedl et al. |
| 2009/0165057 A1 | 6/2009 | Miller et al. |
| 2009/0172722 A1 | 7/2009 | Kahn et al. |
| 2009/0178098 A1 | 7/2009 | Westbrook et al. |
| 2009/0210912 A1 | 8/2009 | Cholas et al. |
| 2009/0235298 A1 | 9/2009 | Carlberg et al. |
| 2009/0254962 A1 | 10/2009 | Hendricks et al. |
| 2009/0260038 A1 | 10/2009 | Acton et al. |
| 2009/0320073 A1 | 12/2009 | Reisman |
| 2009/0320084 A1 | 12/2009 | Azam et al. |
| 2009/0324203 A1 | 12/2009 | Wiklof |
| 2010/0020794 A1 | 1/2010 | Cholas et al. |
| 2010/0037282 A1 | 2/2010 | Iwata et al. |
| 2010/0043022 A1 | 2/2010 | Kaftan |
| 2010/0050225 A1 | 2/2010 | Bennett |
| 2010/0086277 A1 | 4/2010 | Craner |
| 2010/0095323 A1 | 4/2010 | Williamson et al. |
| 2010/0100899 A1 | 4/2010 | Bradbury et al. |
| 2010/0115121 A1 | 5/2010 | Roos et al. |
| 2010/0135639 A1 | 6/2010 | Ellis et al. |
| 2010/0146581 A1 | 6/2010 | Erk |
| 2010/0158479 A1 | 6/2010 | Craner |
| 2010/0158480 A1 | 6/2010 | Jung et al. |
| 2010/0162285 A1 | 6/2010 | Cohen et al. |
| 2010/0169926 A1 | 7/2010 | Westberg et al. |
| 2010/0195827 A1 | 8/2010 | Lee et al. |
| 2010/0217613 A1 | 8/2010 | Kelly |
| 2010/0232604 A1 | 9/2010 | Eklund, II |
| 2010/0235862 A1 | 9/2010 | Adachi |
| 2010/0239228 A1 | 9/2010 | Sano |
| 2010/0242079 A1 | 9/2010 | Riedl et al. |
| 2010/0246582 A1 | 9/2010 | Salinger et al. |
| 2010/0247067 A1 | 9/2010 | Gratton |
| 2010/0251304 A1 | 9/2010 | Donoghue et al. |
| 2010/0251305 A1 | 9/2010 | Kimble et al. |
| 2010/0254386 A1 | 10/2010 | Salinger et al. |
| 2010/0265391 A1 | 10/2010 | Muramatsu et al. |
| 2010/0284537 A1 | 11/2010 | Inbar |
| 2010/0293583 A1 | 11/2010 | Loebig et al. |
| 2010/0299528 A1 | 11/2010 | Le Floch |
| 2010/0306401 A1 | 12/2010 | Gilson |
| 2010/0313222 A1 | 12/2010 | Lee et al. |
| 2010/0319037 A1 | 12/2010 | Kim |
| 2010/0329645 A1 | 12/2010 | Sakamoto |
| 2011/0001879 A1 | 1/2011 | Goldey et al. |
| 2011/0007218 A1 | 1/2011 | Moran et al. |
| 2011/0043652 A1 | 2/2011 | King et al. |
| 2011/0078750 A1 | 3/2011 | Tam et al. |
| 2011/0080529 A1 | 4/2011 | Wong |
| 2011/0099364 A1 | 4/2011 | Robyr et al. |
| 2011/0131413 A1 | 6/2011 | Moon et al. |
| 2011/0138169 A1 | 6/2011 | Michel |
| 2011/0138424 A1 | 6/2011 | Vlot |
| 2011/0145854 A1 | 6/2011 | Bacon et al. |
| 2011/0150429 A1 | 6/2011 | Kaneko |
| 2011/0162011 A1* | 6/2011 | Hassell ............... H04N 21/6143 725/40 |
| 2011/0179453 A1 | 7/2011 | Poniatowski |
| 2011/0225616 A1 | 9/2011 | Ellis |
| 2011/0235701 A1 | 9/2011 | Kim |
| 2011/0239249 A1 | 9/2011 | Murison et al. |
| 2011/0255002 A1 | 10/2011 | Witheiler |
| 2011/0286719 A1 | 11/2011 | Woods |
| 2011/0311045 A1 | 12/2011 | Candelore et al. |
| 2012/0183276 A1 | 7/2012 | Quan et al. |
| 2012/0195433 A1 | 8/2012 | Eppolito et al. |
| 2012/0198501 A1 | 8/2012 | Ruan et al. |
| 2012/0236933 A1 | 9/2012 | Saitoh |
| 2012/0278837 A1 | 11/2012 | Curtis et al. |
| 2012/0296745 A1 | 11/2012 | Harper et al. |
| 2012/0301104 A1 | 11/2012 | Dove |
| 2012/0311534 A1 | 12/2012 | Fox et al. |
| 2012/0311634 A1 | 12/2012 | VanDuyn |
| 2012/0331505 A1* | 12/2012 | Chun et al. ....................... 725/46 |
| 2013/0014146 A1 | 1/2013 | Bhatia et al. |
| 2013/0014159 A1 | 1/2013 | Wiser et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |

(56) References Cited

U.S. PATENT DOCUMENTS

| | | |
|---|---|---|
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0126889 A1 | 5/2014 | Kummer et al. |
| 2014/0130094 A1 | 5/2014 | Kirby et al. |
| 2014/0147102 A1 | 5/2014 | Shartzer et al. |
| 2014/0201767 A1 | 7/2014 | Seiden et al. |
| 2014/0341377 A1 | 11/2014 | Kummer et al. |
| 2014/0344858 A1 | 11/2014 | Minnick |
| 2014/0363139 A1 | 12/2014 | Kirby |
| 2014/0376884 A1 | 12/2014 | Lovell |
| 2015/0040166 A1 | 2/2015 | Tamura et al. |
| 2015/0095948 A1 | 4/2015 | Kummer et al. |
| 2015/0104146 A1 | 4/2015 | Higuchi et al. |
| 2015/0121430 A1 | 4/2015 | Templeman |
| 2015/0208119 A1 | 7/2015 | Casagrande et al. |
| 2015/0208125 A1 | 7/2015 | Robinson |
| 2015/0228305 A1 | 8/2015 | Templeman et al. |
| 2015/0245089 A1 | 8/2015 | Potrebic |
| 2015/0245113 A1 | 8/2015 | Casagrande |
| 2015/0319400 A1 | 11/2015 | Golyshko |
| 2016/0073144 A1 | 3/2016 | Robinson |
| 2016/0080800 A1 | 3/2016 | Casagrande |
| 2016/0105711 A1 | 4/2016 | Martch et al. |

FOREIGN PATENT DOCUMENTS

| | | | |
|---|---|---|---|
| CN | 101 404 780 A | | 4/2009 |
| CN | 101978690 A | | 2/2011 |
| EP | 0 903 743 A | | 3/1999 |
| EP | 0 973 333 A | | 1/2000 |
| EP | 1 001 631 A1 | | 5/2000 |
| EP | 1 168 347 A | | 1/2002 |
| EP | 1372339 A2 | | 12/2003 |
| EP | 1 447 983 A1 | | 8/2004 |
| EP | 1 742 467 A2 | | 1/2007 |
| EP | 2007 116525 A | | 5/2007 |
| EP | 2 018 059 A1 | | 1/2009 |
| EP | 2 317 767 A1 | | 5/2011 |
| EP | 2 357 563 A1 | | 8/2011 |
| EP | 1 667 452 B1 | | 11/2011 |
| EP | 2 403 239 A1 | | 1/2012 |
| EP | 2 541 929 A1 | | 1/2013 |
| EP | 2 826 197 A1 | | 1/2015 |
| EP | 2 826 238 A1 | | 1/2015 |
| GB | 2 459 705 A | | 11/2009 |
| IN | 9740/CHENP/25013 A | | 9/2014 |
| JP | 2010165058 A | | 7/2010 |
| WO | 98/12872 A1 | | 3/1998 |
| WO | 02/41625 A1 | | 5/2002 |
| WO | 2004/057610 A1 | | 7/2004 |
| WO | 2007/047410 A2 | | 4/2007 |
| WO | 2008/010118 A1 | | 1/2008 |
| WO | 2008/010689 A1 | | 1/2008 |
| WO | 2008/060486 A2 | | 5/2008 |
| WO | 2011/027236 A1 | | 3/2011 |
| WO | 2011/081729 A1 | | 7/2011 |
| WO | 2012/003693 A1 | | 1/2012 |
| WO | 2013/028824 A2 | | 2/2013 |
| WO | 2013/028829 A2 | | 2/2013 |
| WO | 2013/028835 A1 | | 2/2013 |
| WO | 2013/138606 A1 | | 9/2013 |
| WO | 2013/138608 A1 | | 9/2013 |
| WO | 2013/138610 A1 | | 9/2013 |
| WO | 2013/138638 A1 | | 9/2013 |
| WO | 2013/138689 A1 | | 9/2013 |
| WO | 2013/138740 A1 | | 9/2013 |

OTHER PUBLICATIONS

International Search Report and Written Opinion of PCT/US2013/031565 mailed on May 31, 2013, 103 pages.
International Search Report and Written Opinion of PCT/US2013/031915 mailed on Jun. 3, 2013, 7 pages.
International Search Report of PCT/KR2007/003521 mailed on Oct. 23, 2007.
International Search Report of PCT/IB2003/005737 mailed on Mar. 3, 2004.
Jensen, Craig, "Fragmentation: the condition, the cause, the cure" 'Online!, Executive Software International, 1994; ISBN: 0964004909; retrieved from Internet: <URL: www.executive.com/fragbook/fragbook.htm>* Chapter: "How a disk works", Section: "The original problem". Retrieved on Jan. 9, 2014.
Extended European Search Report for EP 12825080 mailed Sep. 11, 2014, 10 pages.
Extended European Search Report for EP 12825521 mailed Nov. 24, 2014, 7 pages.
U.S. Appl. No. 14/095,860, filed Dec. 3, 2013 Non-Final Office Action mailed Dec. 26, 2014, 45 pages.
U.S. Appl. No. 14/043,617, filed Oct. 1, 2013 Non Final Office Action mailed Jan. 5, 2015, 45 pages.
U.S. Appl. No. 13/856,752, filed Apr. 4, 2013 Non Final Office Action mailed Nov. 5, 2014, 34 pages
U.S. Appl. No. 13/829,350, filed Mar. 14, 2013 Final Office Action mailed Jan. 23, 2015, 18 pages.
U.S. Appl. No. 13/799,653, filed Mar. 13, 2013 Notice of Allowance mailed Nov. 26, 2014, 32 pages.
U.S. Appl. No. 13/799,604, filed Mar. 13, 2013 Final Office Action mailed Jan. 14, 2015, 36 pages.
U.S. Appl. No. 13/797,173, filed Mar. 12, 2013 Notice of Allowance mailed Nov. 24, 2014, 37 pages.
U.S. Appl. No. 13/757,168, filed Feb. 1, 2013 Notice of Allowance mailed Oct. 14, 2014, 28 pages.
U.S. Appl. No. 13/294,005, filed Nov. 11, 2011 Notice of Allowance mailed Oct. 31, 2014, 24 pages.
U.S. Appl. No. 13/292,047, filed Nov. 8, 2011 Final Office Action mailed Jan. 13, 2015, 22 pages.
U.S. Appl. No. 13/215,598, filed Aug. 23, 2011 Non-Final Office Action mailed Nov. 25, 2014, 18 pages.
U.S. Appl. No. 13/856,752, filed Apr. 4, 2013 Notice of Allowance mailed Feb. 10, 2015, 20 pages.
U.S. Appl. No. 13/797,173, filed Mar. 12, 2013 Notice of Allowance mailed Feb. 26, 2015, 19 pages.
U.S. Appl. No. 13/793,636, filed Mar. 11, 2013, Notice of Allowance mailed Jan. 28, 2015, 43 pages.
U.S. Appl. No. 13/800,477, filed Mar. 13, 2013 Notice of Allowance mailed Feb. 18, 2015, 18 pages.
Extended European Search Report for EP 12825474 mailed Jan. 7, 2015, 6 pages.
Extended European Search Report for EP 12825430 mailed Feb. 3, 2015, all pages.
The Office Action dated Nov. 7, 2014 for Mexican Patent Application No. MX/a/2013/014907 is not translated into English, 3 pages.
The Office Action dated Jan. 23, 2015 for Mexican Patent Application No. MX/a/2013/014671 is not translated into English, 3 pages.
International Search Report and Written Opinion of PCT/US2012/51992 mailed Nov. 2, 2012, 15 pages.
International Search Report and Written Opinion of PCT/US2012/51987 mailed Oct. 23, 2012, 20 pages.
International Search Report and Written Opinion of PCT/US2012/051984 mailed Nov. 5, 2012, 13 pages.

(56) References Cited

OTHER PUBLICATIONS

International Search Report and Written Opinion of PCT/US2012/52002 mailed Oct. 16, 2012, 17 pages.
International Preliminary Report on Patentability for PCT/US2012/052002 mailed on Apr. 17, 2014, 10 pages.
International Search Report and Written Opinion of PCT/US2012/51964 mailed Nov. 2, 2012, 13 pages.
International Search Report and Written Opinion of PCT/US2012/052011 mailed Dec. 17, 2012, 44 pages.
International Preliminary Report on Patentability, PCT/US2012/052011, mailed on Mar. 6, 2014, 6 pages.
International Preliminary Report on Patentability, PCT/US2012/051984, mailed on Mar. 6, 2014, 8 pages.
International Preliminary Report on Patentability, PCT/US2012/051964, mailed on Apr. 10, 2014, 7 pages.
International Preliminary Report on Patentability, PCT/US2012/051992, mailed on Apr. 3, 2014, 7 pages.
International Preliminary Report on Patentability, PCT/US2012/051987, mailed on Mar. 6, 2014, 7 pages.
Author Unknown, "Move Networks is Delivering the Next Generation of Television," Move Networks, 2010, obtained online at http://movenetworks.com/, 2 pages.
Design and implementation of a multi-stream cableCARD with a high-speed DVB-common descrambler; Joonyoung Jung, Ohyung Kwon, Sooin Lee; In proceeding of the 14th ACM International Conference on Multimedia, Santa Barbara, CA, USA, Oct. 23-27, 2006, 4 pages.
U.S. Appl. No. 13/149,852, filed May 31, 2011, Non-Final Office Action mailed Dec. 12, 2012, 9 pages.
U.S. Appl. No. 13/149,852, filed May 31, 2011, Final Office Action mailed Mar. 26, 2013, 13 pages.
U.S. Appl. No. 13/149,852, filed May 31, 2011, Notice of Allowance mailed Jul. 11, 2013, 13 pages.
U.S. Appl. No. 13/286,157, filed Oct. 31, 2011, Non-Final Office Action mailed Jan. 17, 2013, 20 pages.
U.S. Appl. No. 13/286,157, filed Oct. 31, 2011, Non-Final Office Action mailed Jul. 25, 2013, 49 pages.
U.S. Appl. No. 13/286,157, filed Oct. 31, 2011, Notice of Allowance mailed Feb. 3, 2014, 81 pages.
U.S. Appl. No. 13/215,702, filed Aug. 23, 2011, Notice of Allowance mailed Feb. 11, 2013, 13 pages.
U.S. Appl. No. 13/288,002, filed Nov. 2, 2011, Non final Office Action mailed Sep. 26, 2013, 15 pages.
U.S. Appl. No. 13/288,002, filed Nov. 2, 2011, Final Office Action mailed Mar. 27, 2014, 20 pages.
U.S. Appl. No. 13/302,852, filed Nov. 22, 2011, Non-Final Rejection mailed May 23, 2013, 19 pages.
U.S. Appl. No. 13/302,852, filed Nov. 22, 2011, Final Rejection mailed Dec. 9, 2013, 23 pages.
U.S. Appl. No. 13/324,831, filed Dec. 13, 2011 Non-Final Office Action mailed Feb. 28, 2013, 23 pages.
U.S. Appl. No. 13/324,831, filed Dec. 13, 2011 Notice of Allowance mailed Sep. 4, 2013, 22 pages.
U.S. Appl. No. 13/292,047 filed Nov. 8, 2011 Non-Final Office Action mailed Jan. 18, 2013, 17 pages.
U.S. Appl. No. 13/292,047, filed Nov. 8, 2011 Final Office Action mailed Aug. 19, 2013, 17 pages.
U.S. Appl. No. 13/614,899, filed Sep. 13, 2012 Non-Final Office Action mailed Feb. 5, 2013, 17 pages.
U.S. Appl. No. 13/614,899, filed Sep. 13, 2012 Non-Final Office Action mailed Sep. 17, 2013, 17 pages.
U.S. Appl. No. 13/614,899, filed Sep. 13, 2012, Final Office Action mailed Mar. 17, 2014, 41 pages.
U.S. Appl. No. 13/291,014, filed Nov. 7, 2011, Non-Final Office Action mailed Mar. 29, 2013, 21 pages.
U.S. Appl. No. 13/291,014, filed Nov. 7, 2011, Notice of Allowance mailed Aug. 7, 2013, 16 pages.
U.S. Appl. No. 13/215,598, filed Aug. 23, 2011, Non-Final Office Action mailed Jun. 20, 2013, 15 pages.
U.S. Appl. No. 13/215,598, filed Aug. 23, 2011, Final Office Action mailed Nov. 21, 2013, 23 pages.
U.S. Appl. No. 13/215,598, filed Aug. 23, 2011, Non-Final Office Action mailed Feb. 6, 2014, 12 pages.
U.S. Appl. No. 13/215,655, filed Aug. 23, 2011, Non-Final Office Action mailed Sep. 6, 2013, 27 pages.
U.S. Appl. No. 13/215,655, filed Aug. 23, 2011, Final Office Action mailed Dec. 18, 2013, 20 pages.
U.S. Appl. No. 13/215,916, filed Aug. 23, 2011, Notice of Allowance mailed Jan. 4, 2013, 10 pages.
U.S. Appl. No. 13/294,005, filed Nov. 11, 2011, Non-Final Office Action mailed Aug. 14, 2013, 32 pages.
U.S. Appl. No. 13/294,005, filed Nov. 11, 2011, Final Office Action mailed Jan. 3, 2014, 29 pages.
U.S. Appl. No. 13/592,976, filed Aug. 23, 2012, Notice of Allowance mailed Oct. 7, 2013, 18 pages.
U.S. Appl. No. 13/797,173, filed Mar. 12, 2013, Non Final Office Action mailed May 15, 2014, 28 pages.
U.S. Appl. No. 13/799,653, filed Mar. 13, 2013, Non Final Office Action mailed May 8, 2014, 24 pages.
U.S. Appl. No. 13/829,350, filed Mar. 14, 2013, Non Final Office Action mailed Feb. 28, 2014, 29 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Non Final Office Action mailed Oct. 25, 2013, 79 pages.
U.S. Appl. No. 13/799,719, filed Mar. 13, 2013, Notice of Allowance mailed Apr. 23, 2014, 141 pages.
U.S. Appl. No. 14/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
U.S. Appl. No. 13/757,168, filed Feb. 1, 2013 Non Final Office Action mailed Jun. 4, 2014, 23 pages.
U.S. Appl. No. 13/799,604, filed Mar. 13, 2013 Non Final Office Action mailed Jun. 6, 2014, 24 pages.
U.S. Appl. No. 13/614,899, filed Sep. 13, 2012 Non-Final Office Action mailed May 20, 2014, 25 pages.
U.S. Appl. No. 13/215,598, filed Aug 23, 2011 Final Office Action mailed Jul. 2, 2014, 22 pages.
U.S. Appl. No. 13/294,005, filed Nov. 11, 2011 Non-Final Office Action mailed May 20, 2014, 33 pages.
U.S. Appl. No. 13/829,350, filed Mar. 14, 2013 Non Final Office Action mailed Jul. 29, 2014, 24 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.
International Search Report and Written Opinion of PCT/US2013/031432 mailed May 28, 2013, 10 pages.
International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
U.S. Appl. No. 13/302,852, filed Nov. 22, 2011, Non-Final Rejection mailed Sep. 2, 2014, 28 pages.
U.S. Appl. No. 13/793,636, filed Mar. 11, 2013, Non-Final Office Action mailed Sep. 29, 2014, 27 pages.
U.S. Appl. No. 13/800,477, filed Mar. 13, 2013 Non-Final Office Action mailed Sep. 11, 2014, 34 pages.
International Preliminary Report on Patentability for PCT/US2013/032176 mailed Sep. 25, 2014, 7 pages.
International Preliminary Report on Patentability for PCT/US2013/031565 issued Sep. 16, 2014, 18 pages.
International Preliminary Report on Patentability for PCT/US2013/031915 issued Sep. 16, 2014, 5 pages.
International Search Report and Written Opinion of PCT/US2013/031440 mailed May 30, 2013, 14 pages.
International Preliminary Report on Patentability for PCT/US2013/031440 mailed Sep. 25, 2014, 8 pages.

(56) References Cited

OTHER PUBLICATIONS

Author Unknown, "EE Launches home TV service in UK" dated Oct. 8, 2014, 3 pages Retrieved on Oct. 13, 2014 from http://www.bbc.com/news/technology-29535279.
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.
Williams, Christopher, "EE to launch TV set-top box," dated Oct. 7, 2014, 2 pages Retrieved on Oct. 13, 2014 from http://www.telegraph.co.uk/finance/newsbysector/mediatechnologyandtelecoms/telecoms/11147319/EE-to-launch-TV-set-top-box.html.
Author Unknown, "EE TV It's simply great television," Accessed on Oct. 13, 2014, 11 pages Retrieved from https//ee.co.uk/ee-and-me/ee-tv.
U.S. Appl. No. 13/795,914, filed Mar. 6, 2013, Non-Final Office Action mailed Oct. 11, 2013, 17 pages.
U.S. Appl. No. 14/467,959, filed Aug. 25, 2014 Notice of Allowance mailed Jun. 22, 2015, 36 pages.
U.S. Appl. No. 14/095,860, filed Dec. 3, 2013 Final Office Action mailed May 1, 2015, 18 pages.
U.S. Appl. No. 14/060,388, filed Oct. 22, 2013 Notice of Allowance mailed Apr. 13, 2015, 44 pages.
U.S. Appl. No. 13/888,012, filed May 6, 2013 Non-Final Rejection mailed Apr. 6, 2015, 36 pages.
U.S. Appl. No. 13/799,604, filed Mar. 13, 2013, Notice of Allowance mailed May 29, 2015, 46 pages.
U.S. Appl. No. 13/614,899, filed Sep. 13, 2012 Notice of Allowance mailed Mar. 13, 2015, 35 pages.
U.S. Appl. No. 13/302,852, filed Nov. 20, 2011, Notice of Allowance mailed Jun. 19, 2015, 26 pages.
U.S. Appl. No. 13/302,852, filed Nov. 22, 2011 Final Rejection mailed Mar. 30, 2015, 29 pages.
U.S. Appl. No. 13/292,047, filed Nov. 8, 2011 Non-Final Office Action mailed Jul. 7, 2015, 28 pages.
U.S. Appl. No. 13/215,598, filed Aug. 23, 2011 Final Office Action mailed May 5, 2015, 17 pages.
The Notice of Allowance by the Mexican Institute of Industrial Property for Mexican Patent Application No. MX/a/2013/014907 dated Feb. 20, 2015 is not translated into English, 1 page.
The Notice of Allowance by the Mexican Institute of Industrial Property for Mexican Patent Application No. MX/a/2013/014677 dated Mar. 19, 2015 is not translated into English, 1 page.
The Notice of Allowance by the Mexican Institute of Industrial Property for Mexican Patent Application No. MX/a/2013/014671 dated Apr. 17, 2015 is not translated into English, 1 page.
Office Action dated May 18, 2015 for Mexican Patent Application No. MX/a/2014/009776, 2 pages.
Office Action dated May 12, 2015 for Mexican Patent Application No. MX/a/2014/009723, 2 pages.
European Search Report for EP 12825653 dated Mar. 11, 2015, 7 pages.
Supplementary European Search Report for Application No. EP 12825147 dated Mar. 27, 2015, 9 pages.
The second Office Action dated Feb. 26, 2015 for Mexican Pat. Appln. No. MX/a/2013/014217 is not translated into English, 3 pages.
U.S. Appl. No. 14/340,190, filed Jul. 24, 2014, Non-Final Rejection mailed Aug. 31, 2015, 74 pages.
U.S. Appl. No. 14/154,887, filed Jan. 14, 2014 Non-Final Rejection mailed Jul. 17, 2015, 33 pages.
U.S. Appl. No. 13/888,012, filed May 6, 2013 Notice of Allowance mailed Jul. 14, 2015, 18 pages.
U.S. Appl. No. 13/799,604, filed Mar. 13, 2013, Notice of Allowance mailed Jul. 24, 2015, 34 pages.
U.S. Appl. No. 13/288,002, filed Nov. 2, 2011 Non Final Rejection mailed Jul. 28, 2015, 29 pages.
U.S. Appl. No. 13/829,350, filed Mar. 14, 2013 Notice of Allowance mailed Jul. 24, 2015, 29 pages.
U.S. Appl. No. 14/095,860, filed Dec. 3, 2013 Notice of Allowance mailed Jul. 13, 2015, 31 pages.
U.S. Appl. No. 14/043,617, filed Oct. 1, 2013 Final Office Action mailed Jul. 16, 2015, 45 pages.
U.S. Appl. No. 13/786,915, filed Mar. 6, 2013 Non Final Rejection mailed Oct. 15, 2015, 59 pages.
U.S. Appl. No. 13/801,994 Non Final Office Action mailed Oct. 7, 2015, 55 pages.
U.S. Appl. No. 14/095,860, filed Dec. 3, 2013 Notice of Allowance mailed Oct. 19, 2015, 14 pages.
U.S. Appl. No. 14/338,114, filed Jul. 22, 2014 Non-Final Office Action mailed Sep. 30, 2015, all pages.
U.S. Appl. No. 14/529,989, filed Oct. 31, 2014 Non-Final Office Action mailed Nov. 4, 2015, all pages.
U.S. Appl. No. 14/043,617, filed Oct. 1, 2013 Non-Final Office Action mailed Oct. 23, 2015, all pages.
U.S. Appl. No. 14/676,137, filed Apr. 1, 2015 Notice of Allowance mailed Sep. 28, 2015, 35 pages.
Supplementary European Search Report for EP 13760902 mailed Oct. 20, 2015, all pages.
Supplementary European Search Report for EP 13761427 mailed Oct. 19, 2015, all pages.
Office Action dated Jul. 31, 2015 for Mexican Patent Application No. MX/a/2014/009919, 2 pages.
U.S. Appl. No. 13/215,598, filed Aug. 23, 2011 Non Final Office Action mailed Dec. 15, 2015, all pages.
U.S. Appl. No. 14/340,190, filed Jul. 24, 2014, Final Rejection mailed Feb. 19, 2016, 54 pages.
U.S. Appl. No. 14/154,887, filed Jan. 14, 2014 Notice of Allowance mailed Jan. 21, 2016, 26 pages.
U.S. Appl. No. 13/288,002, filed Nov. 2, 2011 Final Rejection mailed Jan. 13, 2016, 22 pages.
U.S. Appl. No. 13/292,047, filed Nov. 8, 2011 Notice of Allowance mailed Jan. 29, 2016, 45 pages.
U.S. Appl. No. 14/589,090, Notice of Allowance mailed Feb. 9, 2016, 47 pages.
U.S. Appl. No. 14/591,549, Non Final Office Action mailed Dec. 31, 2015, 19 pages.
U.S. Appl. No. 14/338,114, filed Jul. 22, 2014 Notice of Allowance mailed Feb. 3, 2016, all pages.
Second Office Action for CN 201280031434.7, issued Dec. 23, 2015, 6 pages.
First Office Action issued by State Intellectual Property Office (SIPO) for CNB 201280028697.2, issued Dec. 16, 2015, 11 pages.
Notice of Allowance received for Mexican Patent Appln. MX/a/2013/014991, mailed on Dec. 9, 2015, 1 page.
Notice of Allowance mailed Dec. 4, 2015 for Mexican Patent Application No. MX/a/2014/009723, 1 page.
Supplementary European Search Report for EP 13761291.7 mailed Jul. 9, 2015, 8 pages.
Extended European Search Report for EP 13760237.1 received Jul. 21, 2015, 8 pages.
First Office Action and Search Report from the State Intellectual Property Office (SIPO) for CN 201280031434.7, issued Jul. 17, 2015, 12 pages.
Office Action dated Jul. 31, 2015 for Mexican Patent Application No. MX/a/2014/009928, 2 pages.
U.S. Appl. No. 14/757,606, filed Dec. 23, 2015, Non Final Rejection mailed Mar. 24, 2016, 33 pages.
International Search Report and Written Opinion of PCT/US2015/065934 mailed Apr. 8, 2016, all pages.
International Search Report and Written Opinion of PCT/EP2015/073937 mailed Apr. 15, 2016, all pages.

* cited by examiner

FIG. 5

| PROGRAM GUIDE | | | | | ⬅ MY HD CHANNELS ▼ | |
|---|---|---|---|---|---|---|
| THURSDAY, 3/3 | 7:00 PM | 7:30 PM | 8:00 PM | 8:30 PM | 9:00 PM | 9:30 PM |
| 031-00 KDVR FOX HD | AMERICAN IDOL | | BONES | | FOX 31 NEWS AT 9PM | |
| 020-00 KTVD | WITHOUT A TRACE | | WITHOUT A TRACE | | 9NEWS AT 9PM | 9NEWS AT 9:30PM |
| 009-00 KUSA NBC HD | COMMUNITY | PERFECT COUPLES | THE OFFICE | PARKS AND RECREATION | 30 ROCK | OUTSOURCED |
| 007-00 KMGH abc HD | WIPEOUT | | GREY'S ANATOMY | | PRIVATE PRACTICE | |
| 006-00 KRMA PBS | WASHINGTON WEEK | COLORADO STATE OF MIND | MCLAUGHLIN GROUP | BBC NEWSNIGHT | NEED TO KNOW | |
| 004-00 KCNC HD | THE BIG BANG THEORY | RULES OF ENGAGEMENT | CSI:NY | | THE MENTALIST | |
| 002-00 KWGN CW HD | CHANNEL 2 NEWS AT 7PM | | VAMPIRE DIARIES | | NIKITA | |

| PROGRAM GUIDE | | | | | ⊖ MY HD CHANNELS ▽ | | |
|---|---|---|---|---|---|---|---|
| THURSDAY, 3/3 | 7:00 PM | 7:30 PM | 8:00 PM | 8:30 PM | 9:00 PM | 9:30 PM | |
| 031-00 KDVR FOX HD | AMERICAN IDOL | | BONES | | FOX 31 NEWS AT 9PM | | |
| 020-00 KTVD mytv HD | WITHOUT A TRACE | | WITHOUT A TRACE | | 9NEWS AT 9PM | 9NEWS AT 9:30PM | |
| 009-00 KUSA NBC HD | COMMUNITY | PERFECT COUPLES | THE OFFICE | PARKS AND RECREATION | 30 ROCK | OUTSOURCED | |
| 007-00 KMGH abc HD PRIMETIME ANYTIME | WIPEOUT | BACHELOR | the middle MCLAUGHLIN GROUP | dancing GREY'S ANATOMY | DESPERATE HOUSEWIVES PRIVATE PRACTICE | THE WHOLE TRUTH | Pane 1204 |
| 006-00 KRMA PBS | WASHINGTON WEEK | COLORADO STATE OF MIND | | BBC NEWSNIGHT | | NEED TO KNOW | |

802

1202

FIG. 12

ELECTRONIC PROGRAMMING GUIDE

CROSS-REFERENCE TO RELATED APPLICATION

This application claims the benefit of U.S. Provisional Patent Application No. 61/611,483, filed 15 Mar. 2012, entitled "RECEPTION, RECORDING, STORAGE, AND MANIPULATION OF MULTIPLE TELEVISION CHANNELS," the entirety of which is hereby incorporated by reference for all intents and purposes.

This application is related to U.S. Nonprovisional patent application Ser. No. 13/793,636, filed on 11 Mar. 2013, entitled "TRANSFER OF TELEVISION PROGRAMS FROM CHANNEL-SPECIFIC FILES TO PROGRAM-SPECIFIC FILES," the entirety of which is hereby incorporated by reference for all intents and purposes.

This application is related to U.S. Nonprovisional patent application Ser. No. 13/829,350, filed on Mar. 14, 2013, entitled "ELECTRONIC PROGRAMMING GUIDE," the entirety of which is hereby incorporated by reference for all intents and purposes.

BACKGROUND

The advent of the DVR (Digital Video Recorder) and the availability of high-capacity and affordable computer-readable storage devices have made available many possibilities to television programming service providers and viewers alike. In recent years, television viewers have come to expect the ability to customize and manage the recording of television programming via their television receivers.

SUMMARY

This Summary does not in any way limit the scope of the claimed subject matter.

In an aspect, a computer-implemented method is disclosed. The method may include scheduling a first program recording timer to record a particular program broadcast on a particular television channel by a television service provider. The method may include scheduling a second program recording timer to record a plurality of programs broadcast consecutively on the particular television channel by the television service provider, including the particular program. The method may include outputting, simultaneously for display within a programming guide and in association with a descriptor of the particular program, a first graphical indicator that identifies scheduling of the first program recording timer, and a second graphical indicator that identifies scheduling of the second program recording timer.

In an aspect, a system including one or more processors and a memory communicatively coupled with and readable by the one or more processors is disclosed. The memory may have stored therein processor-readable instructions which, when executed by the one or more processors, cause the one or more processors to store a first program recording timer to record a particular program broadcast on a particular television channel by a television service provider. The memory may have stored therein processor-readable instructions which, when executed by the one or more processors, cause the one or more processors to store a second program recording timer to record a plurality of programs broadcast consecutively on the particular television channel by the television service provider, including the particular program. The memory may have stored therein processor-readable instructions which, when executed by the one or more processors, cause the one or more processors to output, for simultaneous display within a programming guide and in association with a descriptor of the particular program, a first graphical indicator that identifies scheduling of the first program recording timer, and a second graphical indicator that identifies scheduling of the second program recording timer.

In an aspect, a non-transitory processor-readable medium comprising processor-readable instructions is disclosed. The processor-readable instructions may be configured to cause one or more processors to store a first program recording timer to record a particular program broadcast on a particular television channel by a television service provider. The processor-readable instructions may be configured to cause one or more processors to store a second program recording timer to record a plurality of programs broadcast consecutively on the particular television channel by the television service provider, including the particular program. The processor-readable instructions may be configured to cause one or more processors to output, simultaneously for display within a programming guide and in association with a descriptor of the particular program, a first graphical indicator that identifies scheduling of the first program recording timer, and a second graphical indicator that identifies scheduling of the second program recording timer.

DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

FIG. 5 shows a first example programming guide in accordance with the present disclosure.

FIG. 8 shows a second example programming guide in accordance with the present disclosure.

FIG. 10 shows the programming guide of FIG. 8 in a second modified state.

FIG. 12 shows the programming guide of FIG. 8 in a fourth modified state.

DETAILED DESCRIPTION

Figure 1:
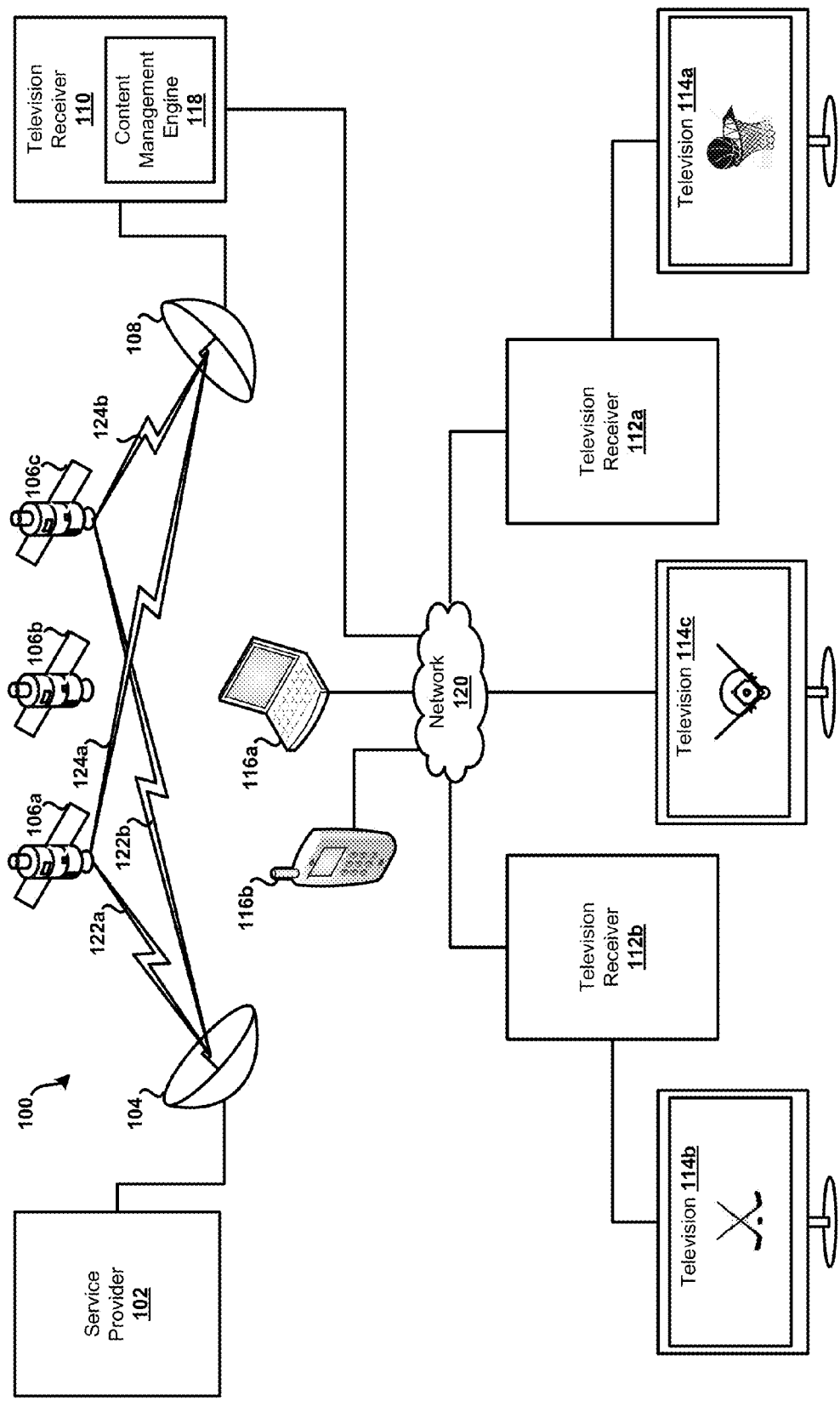
FIG. 1 shows an example media content distribution system in which aspects of the present disclosure may be implemented.

A television viewer, sometimes referred to as a user, may use a stand-alone or integrated DVR to record a particular television program for viewing at a later time. In some situations though, rather than recording individual television programs, multiple television programs of at least one television channel may be recorded for a period of time, such as during television "Primetime," which may for example be defined as being from 8-10 PM, 7-9 PM, 7-10 PM, etc. The recording of a television channel for such a period of time may be defined by a particular television service provider. During this period of time which the television channel is recorded, multiple television programs may be broadcast on the television channel. For example, sitcoms may tend to be scheduled for thirty minutes, including commercials, whereas dramas may tend to be scheduled for an hour including commercials. Recording of a television channel, such as during Primetime, for multiple hours, may result in two or more, possibly six, television programs being recorded.

In some embodiments, rather than a single television channel being recorded at a given time, multiple, such as four, television channels may be recorded over a given time period. For example, during weekday Primetime hours, all of the major networks may be simultaneously recorded for the same period of time. Such recording may permit a user to view any television program that was broadcast during Primetime on one of the major networks at a later time.

Whether a single or multiple television channels are recorded simultaneously, it may be efficient to record a single file for each television channel, with the single file storing multiple television programs broadcast on the television channel during the recording. As an example, when "Network A" is recorded for 2 hours, a single file may be recorded and stored, with the single file containing each of the television programs broadcast by "Network A" during the period of time recorded.

While, perhaps ideally, the recorded television programs would be stored and available for playback indefinitely, storage limitations at the DVR may necessitate that, as additional television programming is recorded, other television programming be deleted. As an example, when Primetime television programming is recorded on each weekday night, it may be efficient to only store the television programming for a predefined period of time, such as the past two weeks. After this time period, unless indicated by a user, the television programming may be deleted. As such, at any given time, a user may have access to the previous two weeks of television programming on television stations recorded during primetime, or some other predefined period of time. The television channels, the dates, and the time period during which multiple television channels are recorded into channel-specific files may be defined by a television service provider, such as a satellite television service provider, a cable television service provider, etc. The storage arrangement on which the channel-specific files are stored may be devoted to recordings made based on a configuration by the television service provider.

During the period of time when the television programs are stored in channel-specific files, a user may be permitted to individually select and watch any of the television programs contained in the channel-specific files. At the end of a predetermined period of time, such as two weeks, the channel-specific file associated with a television channel may be selected for deletion. However one or more television programs may be within this file that a user desires to continue to store for possible viewing at a later time. Such television programs may be indicated by the user and may continue to be stored.

When a channel-specific file is to be deleted, one or more television programs within the channel-specific file may be transferred to a user-managed storage arrangement, such as a different storage device, a different folder residing on a storage device, a separate partition, etc. The portion of the channel-specific file corresponding to the television program may be transferred to the storage arrangement managed by the user. Once transferred, the television program selected by the user may be maintained indefinitely, until the user selects the television program for deletion for example. In the user-managed storage arrangement, television programs may be stored in individual files for each television program, while in the television service provider managed partition, television programs may be stored in television channel-specific files that contain multiple television programs broadcast consecutively.

Referring now to FIG. 1 an example media content distribution system 100 is shown in which aspects of the present disclosure may be implemented. For brevity, the system 100 is depicted in a simplified and conceptual form, and may generally include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The example system 100 may include a service provider 102, a satellite uplink 104, a plurality of orbiting (e.g., geo-synchronous) satellites 106*a*-*c*, a satellite dish 108, a PTR (Primary Television Receiver) 110, a plurality of secondary television receivers 112*a*-*b*, a plurality of televisions 114*a*-*c*, and a plurality of computing devices 116*a*-*b*. In the present example, the PTR 110 may at least include a content management engine 118. The content management engine 118 may in one aspect be configured to manage multiple content storage arrangements of a DVR database, as discussed further below.

The system 100 may also include at least one network 120 that establishes a bi-directional communication path for data transfer between and among the PTR 110, secondary television receivers 112*a*-*b*, televisions 114*a*-*c*, and computing devices 116*a*-*b* of the example system 100. In some embodiments, the network 120 may further establish a bi-directional communication path (not shown) for data transfer between the PTR 110 and the service provider 102. The network 120 is intended to represent any number of terrestrial and/or non-terrestrial network features or elements. For example, the network 120 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, and/or any other type of communication network(s) configured such that data may be transferred between and among respective elements of the example system 100.

The PTR 110, and the secondary television receivers 112*a*-*b*, as described throughout may generally be any type of television receiver, such as a STB (Set Top Box) for example. In another example, the PTR 110, and the secondary television receivers 112*a*-*b*, may exhibit functionality integrated as part of or into a television, a DVR, a computing device, such as a tablet computing device, or any other computing system or device, as well as variations thereof. Further, the PTR 110 and the network 120, together with the secondary television receivers 112a-b, televisions 114a-c, and computing devices 116a-b, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc.

In practice, the satellites 106a-c may be configured to receive uplink signals 122a-b from the satellite uplink 104. In this example, the uplink signals 122a-b may contain one or more transponder streams of particular data or content, such as particular television channel, that is supplied by the service provider 102. For example, each of the respective uplink signals 122a-b may contain various media content such a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 106a-c. Further, different media content may be carried using different transponders of a particular satellite (e.g., satellite 106a); thus, such media content may be transmitted at different frequencies and/or different frequency ranges. For example, a first and second television channel may be carried on a first carrier frequency over a first transponder of satellite 106a, and a third, fourth, and fifth television channel may be carried on second carrier frequency over a first transponder of satellite 106b, or, the third, fourth, and fifth television channel may be carried on a second carrier frequency over a second transponder of satellite 106a, and etc.

The satellites 106a-c may further be configured to relay the uplink signals 122a-b to the satellite dish 108 as downlink signals 124a-b. Similar to the uplink signals 122a-b, each of the downlink signals 124a-b may contain one or more transponder streams of particular data or content, such as various encoded and/or at least partially electronically scrambled television channels, on-demand programming, etc., in accordance with an allotted carrier frequency and bandwidth. The downlink signals 124a-b, however, may not necessarily contain the same or similar content as a corresponding one of the uplink signals 122a-b. For example, the uplink signal 122a may include a first transponder stream containing at least a first group or grouping of television channels, and the downlink signal 124a may include a second transponder stream containing at least a second, different group or grouping of television channels. In other examples, the first and second group of television channels may have one or more television channels in common. In sum, there may be varying degrees of correlation between the uplink signals 122a-b and the downlink signals 124a-b, both in terms of content and underlying characteristics.

Continuing with the example implementation scenario, the satellite dish 108 may be provided for use to receive television channels, such as on a subscription basis, provided by the service provider 102, satellite uplink 104, and/or satellites 106a-c. For example, the satellite dish 108 may be configured to receive particular transponder streams, or downlink signals 124a-b, from one or more of the satellites 106a-c. Based on the characteristics of the PTR 110 and/or satellite dish 108, however, it may only be possible to capture transponder streams from a limited number of transponders concurrently. For example, a tuner of the PTR 110 may only be able to tune to a single transponder stream from a transponder of a single satellite, such as satellite 106a, at a time.

Additionally, the PTR 110, which is communicatively coupled to the satellite dish 108, may subsequently select via tuner (see e.g., FIG. 3), decode, and relay particular transponder streams to the television 114c for display thereon. For example, the satellite dish 108 and the PTR 110 may, respectively, be configured to receive, decode, and relay at least one premium HD-formatted television channel to the television 114c. Programming or content associated with the HD channel may generally be presented "live," or from a recording as previously stored on, by, or at the PTR 110. In this example, the HD channel may be output to the television 114c in accordance with the HDMI/HDCP content protection technologies. Other embodiments are possible. For example, in some embodiments, the HD channel may be output to the television 114c in accordance with the MoCA® (Multimedia over Coax Alliance) home entertainment networking standard. Still other embodiments are possible.

Further, the PTR 110 may select via tuner, decode, and relay particular transponder streams to one or both of the secondary television receivers 112a-b, which may in turn relay particular transponder streams to a corresponding one of the television 114a and the television 114a for display thereon. For example, the satellite dish 108 and the PTR 110 may, respectively, be configured to receive, decode, and relay at least one television channel to the television 114a by way of the secondary television receiver 112a. Similar to the above-example, the television channel may generally be presented "live," or from a recording as previously stored on the PTR 110, and may be output to the television 114a by way of the secondary television receiver 112a in accordance with a particular content protection technology and/or networking standard. Other embodiments are possible.

Still further, the satellite dish 108 and the PTR 110 may, respectively, be configured to receive, decode, and relay at least one premium television channel to one or both of the computing devices 116a-b. Similar to the above-examples, the television channel may generally be presented "live," or from a recording as previously stored on the PTR 110, and may be output to one or both of the computing devices 116a-b in accordance with a particular content protection technology and/or networking standard. Other embodiments are possible.

Figure 2:
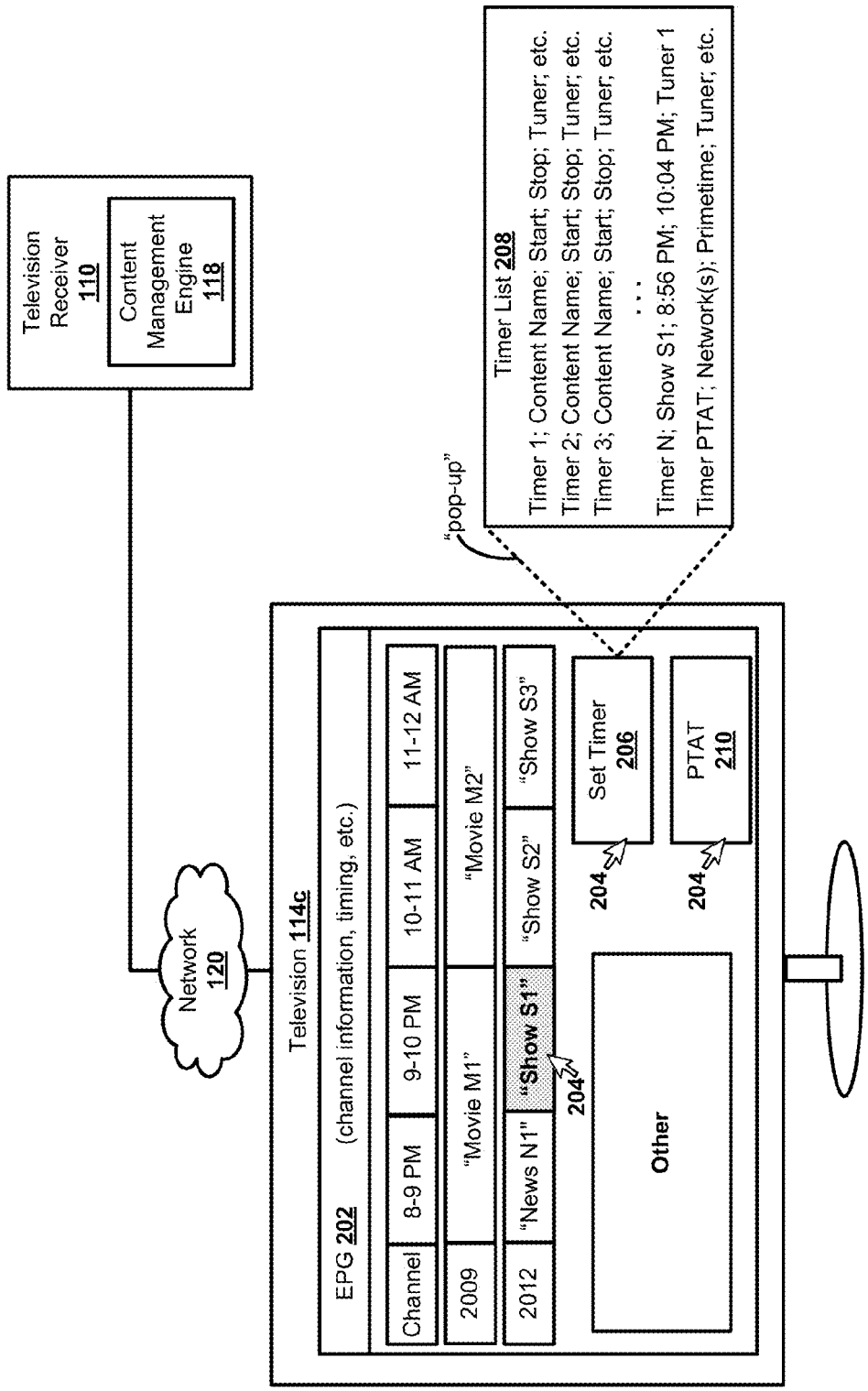
FIG. 2 shows aspects of the example system of FIG. 1 in further detail.

Referring now to FIG. 2, aspects of the example system 100 of FIG. 1 are shown in further detail. In particular, the PTR 110 may be configured to output an EPG (Electronic Programming Guide) 202 to and for presentation by at least the television 114c. The EPG 202 may at least present various information related to television channels and the timing of programs or programming appearing on such television channels, such as television channels as received from one or more of the satellites 106a-c. For example, the EPG 202 may display channel information associated with a channel "2012," where a "Show S1" is listed as scheduled to appear on the channel "2012" during a particular time period "9-10 PM" of a particular day, etc. In this example, and assuming that a current time is sometime during the time period "9-10 PM" of a particular day, a user may manipulate a cursor 204 using a pointing device (not shown) to select the "Show S1" for immediate viewing on the television 114c. Other embodiments are possible. For example, it is envisioned that any means consistent with menu-driven navigation may be used to interact with the EPG 202, and respective elements of the EPG 202.

The EPG 202 may further display or otherwise present a first user-selectable icon 206 that may be selected to set a recording timer to automatically record a particular program for later viewing. In this example, the PTR 110 may exhibit DVR functionality to record programs or programming appearing on various channels as received from satellites 106a-c. For example, and assuming that a current time is sometime prior the time period "9-10 PM," such as a current time within the time period "8-9 PM" preceding the "9-10 PM" time period, a user may manipulate the cursor 204 to select the "Show S1" as displayed within the EPG 202 for recording by the PTR 110 for later viewing one or more of the televisions 114a-c and the computing devices 116a-b.

For example, during or within the time period "8-9 PM" and following "selection" of the "Show S1," as shown by stipple shading in FIG. 2, a user may manipulate the cursor 204 to select the icon 206 to set a particular "Timer N" to automatically record the "Show S1" for later viewing. In this example, the "Timer N," where N is a non-zero integer value, is shown within a timer list 208 that may, in some embodiments, be presented within the EPG 202 (e.g., fully or at least partially superimposed over EPG 202) in response to selection of the icon 206. In general, the timer list 208 may itemize or include an inventory of all "currently" or "presently" enabled program recording timers, along with particular information associated with each timer.

For example, the particular information may include a "Content Name" parameter, a recording "Start" time parameter, a recording "Stop" time parameter, and other parameters as desired. For example, in some embodiments, the information may include a "Tuner" parameter that designates a particular tuner that is to be used to "tune" to the "Show S1," such that the "Show S1" may be recorded for later viewing. In one embodiment, the "Tuner" parameter may be manually set by a user. For example, and as shown within the timer list 208 of FIG. 2, a "Tuner 1" may have been manually set by a user upon creation of the "Timer N." However, other embodiments are possible. For example, in some embodiments, the "Tuner 1" may be a "default" tuner automatically set by the PTR 110 upon creation of the "Timer N." Still other embodiments are possible.

As may be understood based upon the preceding description, a user may use a stand-alone or integrated DVR, such as the PTR 110, to record individual broadcast television programming for viewing at a later time. A user may further may use the PTR 110 to record multiple instances of broadcast television programming, such as during television Prime Time, or Primetime, which may for example be between or from 8-10 PM, 7-9 PM, 7-10 PM, etc., on any particular day. The recording of a television channel for such a period of time may be defined by a television service provider, such as the service provider 102 shown in FIG. 1. During this period of time, at which the television channel is recorded, multiple television programs may be broadcast on the television channel. For example, sitcoms may tend to be scheduled for thirty minutes, including commercials, and dramas may tend to be scheduled for an hour including commercials. Recording of a television channel, such as during Primetime, for multiple hours may result in two or more, possibly six, television programs being recorded.

In some scenarios, rather than a single television channel being recorded at a given time, multiple, such as four, television channels may be recorded over a given time period. For example, during weekday Primetime hours, all of the major networks may be simultaneously recorded for the same period of time. Such recording may permit a user to view at a later time any television program that was broadcast during Primetime on one of the major networks. When multiple television channels are recorded simultaneously, it may be efficient to use a single tuner to receive all of the multiple television channels being recorded. This may allow other tuners of the television receiver to be used for other operations such as, for example, recording of other television channels and/or presentation of television channels to a user via a viewing device, such as a television.

To implement or facilitate implementation of such functionality, the EPG 202 may further display or present a second user-selectable icon 210 that may be selected to set at least one recording timer to automatically record multiple instances of broadcast television programming, possibly over multiple channels, such as during television Primetime. In this example, a user may manipulate the cursor 204 to select the icon 210 to set a particular "Timer PTAT" to automatically record television Primetime for later viewing on one or more of the televisions 114a-c and the computing devices 116a-b. In some embodiments, the "Timer PTAT" may be included within the timer list 208 that may be presented within the EPG 202 in response to selection of the icon 206 and/or icon 210. Other embodiments are possible.

In general, the "Timer PTAT" when itemized within the timer list 208 may include particular information. The particular information may for the most part be defined by the service provider 102 as shown in FIG. 1. Example information associated with the "Timer PTAT" may at least include a "Network(s)" parameter, a "Primetime" parameter, and a "Tuner" parameter. The "Network(s)" parameter may specify at least one network channel to record such as, for example, an NBC network channel, an ABC network channel, a CBS network channel, a FOX network channel, and etc. The "Primetime" parameter may specify a particular time period, and frequency, at which television programming appearing on the network channel(s) specified by the "Network(s)" parameter may be recorded, such as from 7 PM to 10 PM on the NBC, ABC, CBS, and FOX networks each weeknight. The "Tuner" parameter may designate a particular tuner that is to be used to "tune" to the television programming appearing on the network channel(s) specified by the "Network(s)" parameter, such that the same may be recorded for later viewing. In one embodiment, the "Tuner" parameter may be manually set by a user. In other embodiments, the "Tuner" may be specify a "default" tuner automatically set by the PTR 110 upon creation of the "Timer PTAT."

Figure 3:
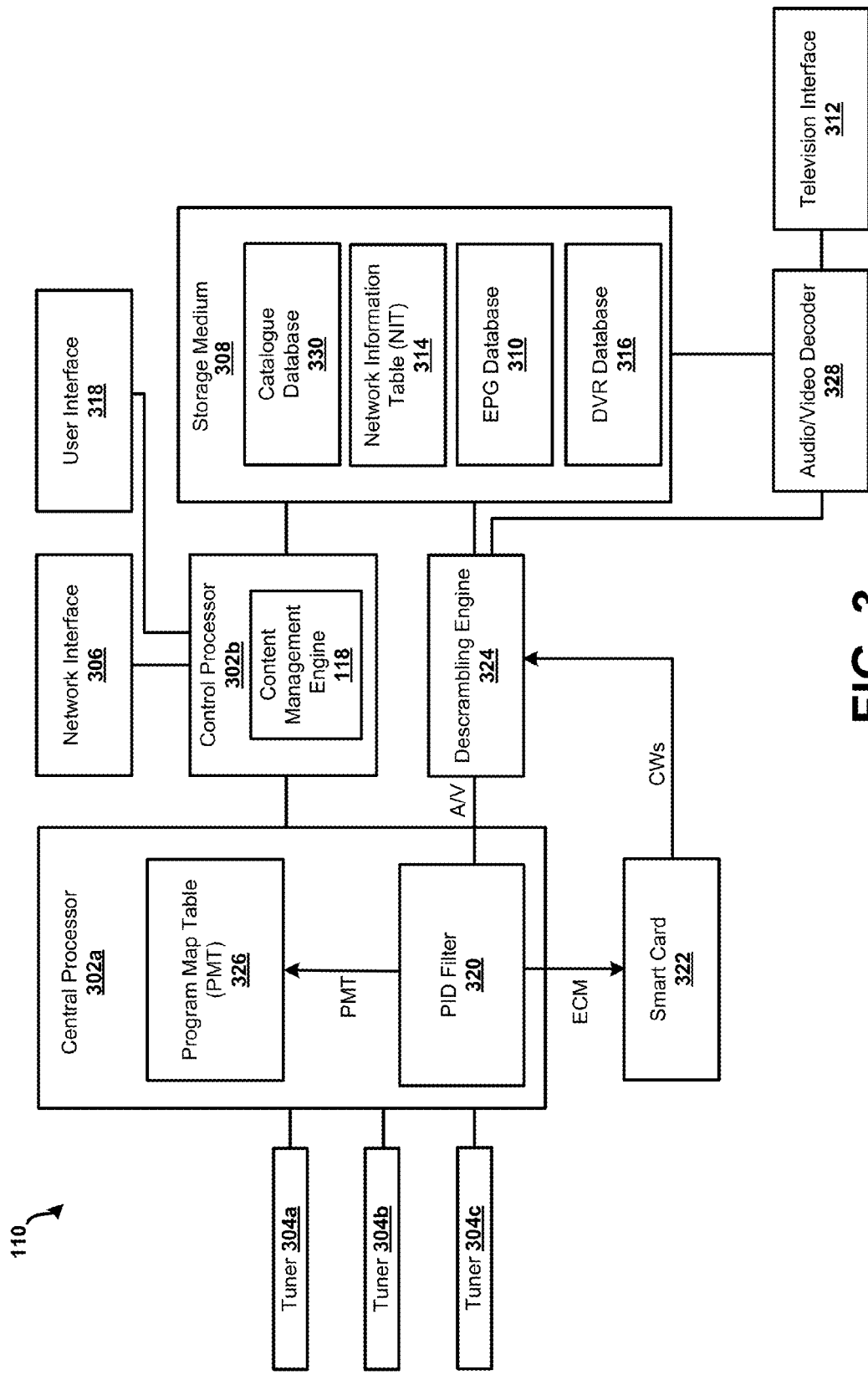
FIG. 3 shows a simplified block diagram of a television receiver of FIG. 1.

Referring now to FIG. 3, a simplified block diagram of the PTR 110 of FIG. 2 is shown in accordance with the present disclosure. In some embodiments, at least one of the secondary television receivers 112a-b may be configured in a manner similar to that of the PTR 110. In other embodiments, at least one of the secondary television receivers 112a-b may be configured to exhibit a reduced functionality as compared to the PTR 110, and may depend at least to a certain degree on the PTR 110 to implement certain features or functionality. In this example, the secondary television receivers 112a-b may be referred to as a "thin client."

For brevity, the PTR 110 is depicted in a simplified and conceptual form, and may generally include more or fewer elements or components as desired in accordance with the present disclosure. For example, the PTR 110 is shown in FIG. 3 to include the content management engine 118 as mentioned above in connection with FIG. 2. Additionally, although not explicitly shown in FIG. 3, the PTR 110 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such a functionality. Additionally, the PTR 110 may be configured to include any number of other various components or logical modules that are implemented in hardware, software, firmware, or any combination thereof, and such components or logical modules may or may not be implementation-specific.

In some embodiments, the PTR 110 and/or the secondary television receivers 112a-b comprise of a STB. In addition to being in the form of an STB, at least the PTR 110 may be incorporated into another device, such as the television 114c. For example, the television 114c may have an integrated television receiver that does not involve an external STB being coupled with the television 114c. A STB may contain some or all of the components of the PTR 110 and/or may be able to perform some or all of the functions of the PTR 110. Accordingly, instances in this document referring to a STB, and steps being performed by a STB, may also be performed, more generally, by the PTR 110 and/or secondary television receivers 112a-b.

Referring still to FIG. 3, the PTR 110 may be configured to record omnibus channel files and extract a television program from a recorded omnibus channel file, and may include the content management engine 118 as shown in FIG. 2, at least one processor 302, including a central processor 302a and a control processor 302b, a plurality of tuners 304a-c, at least one network interface 306, at least one non-transitory computer-readable storage medium 308, at least one EPG database 310, at least one television interface 312, at least one NIT (Networking Information Table) 314, at least one DVR database 316, at least one user interface 318, at least one PID filter 320, at least one smart card 322, at least one descrambling engine 324, at least one PMT (Program Map Table) 326, at least one decoder 328, and a catalogue database 330. In other embodiments of the PTR 110, fewer or greater numbers of components may be present. Further, functionality of one or more components may be combined; for example, functions of the descrambling engine 324 may be performed by the central processor 302a. Still further, functionality of components may be spread among additional components. For example, the PID filter 320 may be handled by hardware and/or software separate from the PMT 326.

The processor 302 may include one or more specialized and/or general-purpose processors configured to perform processes such as tuning to a particular channel, accessing and displaying EPG information from the EPG database 310, and/or receiving and processing input from a user. For example, processor 302 may include one or more processors dedicated to decoding video signals from a particular format, such as MPEG (Moving Picture Experts Group), for output and display on a television and for performing decryption.

The control processor 302b may communicate with the central processor 302a. The control processor 302b may control the recording of television channels based on timers stored in the DVR database 316. The control processor 302b may initiate recording of a television channel by sending a record command along with an indication of the television channel to be recorded to the central processor 302a. The control processor 302b may not send a second record command, when additional recording is to begin at the same time, until an acknowledgement that recording of the first television channel has successfully been received and initiated by the central processor 302a. The control processor 302b may also provide commands to the central processor 302a when recording of a television channel is to cease. In addition to providing commands relating to the recording of television channels, the control processor 302b may provide commands to the central processor 302a that indicate television channels to be output to the decoder 328 for output to a presentation device, such as the television 114c for example.

The control processor 302b may also communicate with the network interface 306 and the user interface 318. The control processor 302b may handle in-coming data from the network interface 306 and the user interface 318. Additionally, the control processor 302b may be configured to output data via the network interface 306.

The tuners 304a-c may be used to tune to television channels, such as television channels transmitted via satellite or cable, such as satellites 106a-c. Each respective one of the tuner 304a-c may be capable of receiving and processing a single stream of data from a satellite transponder, or a cable RF channel, at a given time. As such, a single tuner may tune to a single transponder or, for a cable network, a single cable RF channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. Still another tuner (e.g., tuner 304c) may be used to check various television channels to determine if they are available or not. If multiple television channels transmitted on the same transponder stream are desired, a particular tuner (e.g., tuner 304a) may be used to receive the signal containing the multiple television channels for presentation and/or recording. The tuners 304a-c may receive commands from the central processor 302a. Such commands may instruct the tuners 304a-c which frequencies are to be used for tuning.

The network interface 306 may be used to communicate via an alternate communication channel with a television service provider. For example, the primary communication channel may be via satellite, which may be unidirectional to the STB, and the alternate communication channel, which may be bi-directional, may be via a network, such as the Internet. The PTR 110 may be able to communicate with the service provider 102 of FIG. 1 via a network, such as the Internet. This communication may be bidirectional. For example, data may be transmitted from the PTR 110 to the service provider 102, and from the service provider 102 to the PTR 110. The network interface 306 may be configured to communicate via one or more networks, such as the Internet, to communicate with the service provider 102. Information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. The storage medium 308 may store information related to the EPG database 310, the NIT 314, and/or the DVR database 316. Recorded television programs may be stored using the storage medium 308. The storage medium 308 may be partitioned or otherwise divided such that predefined amounts of the storage medium 308 are devoted to storage of omnibus channel files and user-selected television programs.

The EPG database 310 may store information related to television channels and the timing of programs appearing on such television channels. The EPG database 310 may be stored using the storage medium 308, which may be a hard drive. Information from the EPG database 310 may be used to inform users of what television channels or programs are popular and/or provide recommendations to the user. Information from the EPG database 310 may provide the user with a visual interface (e.g., EPG 202) displayed by a television that allows a user to browse and select television channels and/or television programs for viewing and/or recording. Information used to populate the EPG database 310 may be received via the network interface 306 and/or via satellites, such as satellites 106a-c of FIG. 1 via the tuners 304a-c. For instance, updates to the EPG database 310 may be received periodically via satellite. The EPG database 310 may serve as an interface for a user to control DVR functions of the PTR 110, and/or to enable viewing and/or recording of multiple television channels simultaneously.

In addition to being used to provide users with information about scheduled programming, information from the EPG database 310 may be used to determine when television programs begin and end for the purposes of recording. For instance, when a channel-specific file is recorded that contains multiple television channels, the start and end of time of specific television programs within the channel-specific file may be based on the start and end times indicated in the EPG database 310. Other data may be stored within the EPG database 310 that may be useful in managing channel-specific files, such as series identifiers and episode identifiers, which may be used by a television service provider to identify particular television programs.

The decoder 328 may serve to convert encoded video and audio into a format suitable for output to a display device. For instance, the decoder 328 may receive MPEG video and audio from the storage medium 308, or the descrambling engine 324, to be output to a television. MPEG video and audio from the storage medium 124 may have been recorded to the DVR database 316 as part of a previously-recorded television program. The decoder 328 may convert the MPEG video and audio into a format appropriate to be displayed by a television or other form of display device and audio into a format appropriate to be output from speakers, respectively.

The television interface 312 may serve to output a signal to a television, or another form of display device, in a proper format for display of video and playback of audio. As such, the television interface 312 may output one or more television channels, stored television programming from the storage medium 308, such as television programs from the DVR database 316 and/or information from the EPG database 310 for example, to a television for presentation.

The NIT 314 may store information used by the PTR 110 to access various television channels. The NIT 314 may be stored using the storage medium 308. Information used to populate the NIT 314 may be received via satellite, or cable, via the tuners 304a-c and/or may be received via the network interface 306 from a service provider. As such, information present in the NIT 314 may be periodically updated. The NIT 314 may be locally-stored by the PTR 110 using the storage medium 308. Information that may be present in the NIT 314 may include, for example: television channel numbers, a satellite identifier, a frequency identifier, a transponder identifier, an ECM (Entitlement Control Message) PID (Packet Identifier), one or more audio PIDs, and a video PID. A second audio PID of a channel may correspond to a SAP (Second Audio Program) program, such as in another language. In some embodiments, the NIT 314 may be divided into additional tables. For example, rather than the specific audio PIDs and video PIDs being present in the NIT 314, a channel identifier may be present within NIT 314 which may be used to look up the audio PIDs and video PIDs in another table, such as the PMT 326. For example, the PMT 326 may store information on audio PIDs and video PIDs for television channels that are transmitted on a transponder frequency.

Table 1 below provides a simplified example of the NIT 314 for several television channels. It should be understood that in other embodiments, many more television channels may be represented in the NIT 314. The NIT 314 may be at least periodically updated by a television service provider. As such, television channels may be reassigned to different satellites and/or transponders, and the PTR 110 may be able to handle this reassignment as long as the NIT 314 is updated.

TABLE 1

| Channel | Satellite | Transponder | ECM PID | PMT PID |
|---------|-----------|-------------|---------|---------|
| 4       | 1         | 2           | 27      | 1001    |
| 5       | 2         | 11          | 29      | 1002    |
| 7       | 2         | 3           | 31      | 1001    |
| 13      | 2         | 4           | 33      | 1004    |

Based on information in the NIT 314, it may be possible to determine the proper satellite and transponder to which to tune for a particular television channel. In some embodiments, the NIT 314 may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 314. Additional information on how the NIT 314, as indicated in Table 1, may be used is provided in reference to FIG. 3. The same PID may be reused on different transponders.

A DVR may permit a television channel to be recorded for a period of time. DVR functionality of the PTR 110 may be managed by the control processor 302b. The control processor 302b may coordinate the television channel, start time, and stop time of when recording of a television channel is to occur. The DVR database 316 may store information related to the recording of television stations. The DVR database 316 may store timers that are used by the control processor 302b to determine when a television channel should be tuned to and its programs recorded to the DVR database 316. However, other embodiments are possible. For example, in some embodiments, the storage medium 308 may store timers. Timer files may be defined as a daily_schedule_db.dat file and a gloal_timer_db.dat file. In general, when a "new" timer is created, a "new" entry may be added into the daily_schedule_db.dat and gloal_timer_db.dat files, which may include all timer related information such as channel number, start time, duration, etc. Further, a limited amount of the storage medium 308 may be devoted to the DVR database 316. Timers may be set by a service provider and/or one or more users of the PTR 110.

DVR functionality of the control processor 302b may have multiple modes. For example, DVR functionality of the control processor 302b may be configured to record individual television programs selected by a user to the DVR database 316. Using the EPG database 310, a user may select a particular television program. Based on the date, time period, and television channel indicated by the EPG database 310, the control processor 302b may record the associated television program to the DVR database 316. In another example, the DVR database 316 may be used to store recordings of predefined periods of time on one or more television channels. These predefined periods of time may include one or more television programs. For example, Primetime on a particular television network may be recorded each weekday night. Further, multiple television channels may be recorded for such predefined periods of time. Such recording of television channels for predefined periods of time may be defined by a television service provider (e.g., service provider 102).

As an example of this second mode of DVR functionality, a television service provider may configure the PTR 110 to record television programming on multiple, predefined television channels for a predefined period of time, on predefined dates. For instance, a television service provider may configure the PTR 110 such that television programming may be recorded from 7 PM to 10 PM on the NBC, ABC, CBS, and FOX networks each weeknight. When a television program is selected for recording by a user and is also specified for recording by the television service provider, the user selection may serve as an indication to save the television program for an extended time, beyond the time which the predefined recording would otherwise be saved.

Whether recording is performed based on a user-selected television program or selection by a television service provider, selection may result in storage by DVR database 316 being managed differently. Separate storage arrangements, such as separate partitions on the same storage device, may be allocated based on which entity designated the television program/channel for recording. As such, the DVR database 316 may use multiple storage arrangements, such as multiple partitions on the storage medium 225. Television programming recorded based on a television service provider selection may be stored on a first storage arrangement. Television programming recorded based on user selection may be stored on a second storage arrangement. Television programming on the first storage arrangement may automatically be deleted after a predefined period of time, such as two weeks. If a television program stored by the first storage arrangement is selected by a user (such as via a displayed EPG) to be saved, the television program may be transferred from the first storage arrangement to the second storage arrangement, such as when the television programming would otherwise be deleted from the first storage arrangement. Additional detail regarding the recording, storage, and maintenance of television programming by the PTR 110 is provided below in conjunction with at least FIG. 4.

The user interface 318 may include a remote control, physically separate from PTR 110, and/or one or more buttons on the PTR 110 that allows a user to interact with the PTR 110. The user interface 318 may be used to select a television channel for viewing, view information from the EPG database 310, and/or program a timer stored to the DVR database 316 wherein the timer may be used to control the DVR functionality of the control processor 302b.

Referring back to tuners 304a-c, television channels received via satellite, or cable, may contain at least some scrambled data. Packets of audio and video may be scrambled to prevent unauthorized users, such as nonsubscribers, from receiving television programming without paying the television service provider. When one of the tuners 304a-c is receiving data from a particular transponder of a satellite, the transponder stream may be a series of data packets corresponding to multiple television channels. Each data packet may contain a PID, which, in combination with the NIT 314 and/or the PMT 326, can be determined to be associated with a particular television channel. Particular data packets, referred to as ECMs may be periodically transmitted. ECMs may be associated with another PID and may be encrypted; the PTR 110 may use the smart card 322 to decrypt ECMs. Decryption of an ECM may only be possible when the user (e.g., PTR 110) has authorization to access the particular television channel associated with the ECM. When an ECM is determined to correspond to a television channel being stored and/or displayed, the ECM may be provided to the smart card 322 for decryption.

When the smart card 322 receives an encrypted ECM, the smart card 322 may decrypt the ECM to obtain some number of control words. In some embodiments, from each ECM received by the smart card 322, two control words are obtained. In some embodiments, when the smart card 322 receives an ECM, it compares the ECM to the previously received ECM. When the two ECMs match, the second ECM is not decrypted because the same control words would be obtained. In other embodiments, each ECM received by the smart card 322 is decrypted; however, when a second ECM matches a first ECM, the outputted control words will match; thus, effectively, the second ECM does not affect the control words output by the smart card 322. The smart card 322 may be permanently part of the PTR 110 or may be configured to be inserted and removed from PTR 110.

The central processor 302a may be in communication with the tuners 304a-c and the control processor 302b. The central processor 302a may be configured to receive commands from the control processor 302b. Such commands may indicate when to start/stop recording a television channel and/or when to start/stop causing a television channel to be output to a television. The central processor 302a may control the tuners 304a-c. The central processor 302a may provide commands to the tuners 304a-c that instruct the tuners which satellite, transponder, and/or frequency to tune to. From the tuners 304a-c, the central processor 302a may receive transponder streams of packetized data. As previously detailed, some or all of these packets may include a PID that identifies the content of the packet.

The central processor 302a may be configured to create at least one PID filter 320 that sorts packets received from the tuners 304a-c based on the PIDs. When a tuner is initially tuned to a particular frequency, such as a particular transponder of a satellite, a PID filter may be created based on a PID of PMT data. The PID of PMT data packets may be known because it is stored as part of the NIT 314. From the PMT data packets, the PMT 326 may be constructed by central processor 302a. Table 2 below provides an exemplary snapshot of a PMT. The PMT 326 may be specific to a particular transponder. As such, when tuning to a different transponder occurs, a new PMT may be created for the different transponder.

TABLE 2

| Channel | Video PID | $1^{st}$ Audio PID | $2^{nd}$ Audio PID |
|---|---|---|---|
| 4 | 1003 | 2383 | 2119 |
| 5 | 2993 | 2727 | 2728 |
| 7 | 9238 | 1233 | 0129 |
| 13 | 0012 | 9348 | — |

Accordingly, based on the information present in the PMT 326, the audio and video PIDs for specific television channels may be identified. A television channel may have multiple audio PIDs due to a second audio program, which may be in a different language. It should be understood that the values provided in Table 2 are for example purposes only. Actual values may vary. Additional information or less information may also be stored in the PMT 326.

The PID filter 320 may be configured to filter data packets based on PIDs. In some embodiments, the PID filter 320 is created and executed by central processor 302a. In other embodiments, separate hardware may be used to create and execute multiple PID filters. Depending on a television channel selected for recording/viewing, a PID filter may be created to filter the video and audio packets associated with the television channel, based on the PID assignments present in the PMT 326. For example, when a transponder data stream includes multiple television channels, data packets corresponding to a television channel that is not desired to be stored or displayed by the user, may be ignored by PID filters. As such, only data packets corresponding to the one or more television channels desired to be stored and/or displayed may be filtered and passed to either the descrambling engine 324 or the smart card 322; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to the NIT 314, may be appropriately routed by the PID filter 320. At a given time, one or multiple PID filters may be executed by the central processor 302a.

The descrambling engine 324 may use the control words output by the smart card 322 in order to descramble video and/or audio corresponding to television channels for storage and/or presentation Video and/or audio data contained in the transponder data stream received by the tuners 304a-c may be scrambled. Video and/or audio data may be descrambled by descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage in the DVR database 316 and/or to the decoder 328 for output to a television or other presentation equipment via the television interface 312.

The catalog database 330 may be used by the PTR 110 to store information about television programs that are stored as part of a channel-specific file and in individual television program files. The catalog database 330 may be updated as television programs are recorded, transferred, and as files corresponding to television programming are deleted. Data stored in catalog database 270 may be used to locate television programs within a channel-specific file and a program-specific file. The catalog database 330 is discussed in further detail below in connection with FIG. 4.

For simplicity, the PTR 110 of FIG. 3 has been reduced to a block diagram; commonly known parts, such as a power supply, have been omitted. Further, some routing between the various modules of PTR 110 has been illustrated. Such illustrations are for exemplary purposes only. The state of two modules not being directly or indirectly connected does not indicate the modules cannot communicate. Rather, connections between modules of the PTR 110 are intended only to indicate possible common data routing. It should be understood that the modules of the PTR 110 may be combined into a fewer number of modules or divided into a greater number of modules. Further, the components of the PTR 110 may be part of another device, such as built into a television. Also, while the PTR 110 may be used to receive, store, and present television channels received via a satellite, it should be understood that similar components may be used to receive, store, and present television channels via a cable network.

Figure 4:
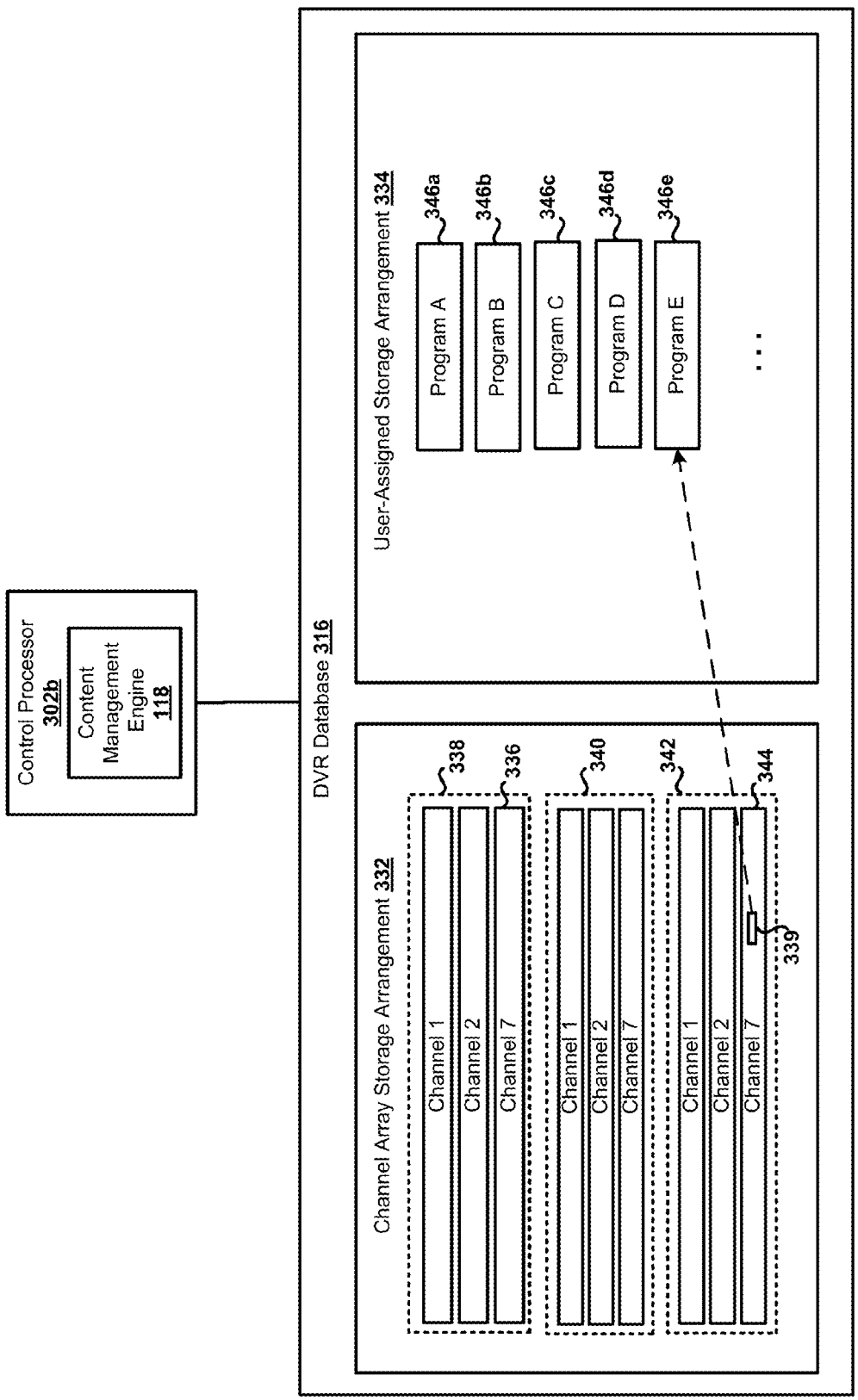
FIG. 4 shows a block diagram of particular components of the television receiver of FIG. 3.

Referring now to FIG. 4, a block diagram is shown illustrating particular components of the PTR 110 of FIG. 3. More specifically, FIG. 4 shows the control processor 302b, including the content management engine 118, and the DVR database 316 of the PTR 110. In this example, the content management engine 118 may be configured to manage multiple content storage arrangements, including at least a channel array storage arrangement 332 and user-assigned storage arrangement 334, of the DVR database 316. Other embodiments are possible. For example, in some embodiments, the channel array storage arrangement 332 and user-assigned storage arrangement 334 may not be stored on the same device, but may be stored on separate devices. Further, in some embodiments, the content management engine 118 may be wholly or at least partially located on one or more other components of the PTR 110, such as the central processor 402a. Additionally, the content management engine 118 may be wholly or at least partially located on one or more other components of the example system 100, such as the service provider 102, secondary television receivers 112a-b, etc. Still other embodiments are possible.

In one embodiment, the content management engine 118 may interact with the channel array storage arrangement 332 to store recordings of television channels, where the recordings may each include multiple television programs. The time periods, dates, and television channels that are recorded to the channel array storage arrangement 332 may be defined by a television service provider. The DVR database 316 may store recorded television channel arrays recorded by the PTR 110 in accordance with rules defined by the television service provider. For instance, a television service provider may define that multiple television channels, such channels 1, 2, and 7 as illustrated in FIG. 4 for example, are to be recorded on each weekday night from 7 PM to 10 PM. A televisions service provider may define the channels, dates, and time periods for which channel arrays are recorded by a particular television receiver. For each television channel and each time period, a separate file may be created. For example, a first omnibus channel file 336 may correspond to a particular television channel 7 and a particular date. In contrast, a first omnibus channel file array 338 may represent three files created for the predefined time period of 7 to 10 PM for preselected television channels 1, 2, and 7. A separate file may be created for each television channel on each day that recording occurs. For example, the first omnibus channel file array 338 may correspond to a first day, while a second omnibus channel file array 340 may correspond to another day, and a third omnibus channel file array 342 may correspond to another day.

Each omnibus channel file of the respective omnibus channel file arrays 338, 340, and 342 may contain multiple television programs. In general, a television program is a scheduled production such as a movie, documentary, animation, live event, sporting event, sitcom, drama, etc., which may or may not be episodic. A television program is not a commercial. For example, content such as commercials, public service announcements, etc., that air during the broadcast of a particular television program would not be considered separate television programs. Typically, a television program is scheduled for at least 30 minutes. Many television programs appearing during prime time on weekdays are either 60 minutes or 30 minutes in scheduled length. These periods of time may contain time allocated to the scheduled television program and commercials that are to be aired during the scheduled television program.

While an omnibus channel file, such as the omnibus channel file 344, may store audio and video data corresponding to multiple television programs, a separate database may be maintained with program information, such as for locating television programs within a particular omnibus channel file. One example of such a database may include the catalog database 330 of the PTR 110. For each recorded television program, an entry may be made in the catalog database 330. The catalog database 330 may indicate an identifier for a television program and a file in which the television program is stored. If the television program is stored as part of an omnibus channel file, a file offset may be stored within the catalog database 330 for the television program. Table 3 below provides an example of several entries which may be present in the catalog database 330. In some embodiments, a catalog database may store series and episode identifiers for some or all television programs.

TABLE 3

| PID | File Name | File Offset (bytes) | Marked for Save? |
|---|---|---|---|
| 2738239 | es2738239.tsp | 0 | No |
| 9034836 | es2738239.tsp | 9832939 | Yes |
| 4854557 | es1003293.tsp | 10239832 | No |
| 1122092 | es1122092.tsp | 0 | No |

As indicated in Table 3, the catalog database 330 may include a television program identifier, a file name of the file in which the television program resides, a file offset (if any), and an indication of whether a user has marked the corresponding television program for saving. A television program identifier may be a unique number that is assigned to a television program at the television receiver. The file name associated with each television program identifier may indicate the file in which the associated television program is stored. This file may be a file specific to the television program or may be a channel-specific file (an omnibus channel file) which contains multiple television programs. As an example, the first two television program identifiers in Table 3 each correspond to the same file name. Accordingly, both of these television program identifiers are associated with television programs present in the same omnibus channel file. In some embodiments, it may be a practice to name each omnibus channel file after the program identifier of the first television program recorded to the omnibus channel file. As such, the filename associated with television program identifier "2738239" contains "2738239." The file offset may be used to determine a location within a file for television programs that contains multiple television programs.

During recording, the file offset may be determined. For the first television program recorded as part of an omnibus channel file, the offset may be zero. For subsequent television programs recorded to the same omnibus channel file, the file offset may be determined by measuring the file size, in bytes, when the television program begins recording. It may be determined when the television program begins recording based on the start time for the television program indicated in an electronic programming guide stored by the television receiver. For example, in Table 3 the television program associated with television program identifier 9034836 begins at a file offset of 9832939 bytes. A television program is determined to end at either the end of the file or the next file offset within the same file indicated by the catalog database. For example the television program associated with television program identifier "2738239" ends at a file offset of 9832938 bytes, based on the file offset associated with television program identifier "9034836."

Each omnibus channel file stored by channel array storage arrangement 332 may be deleted on a scheduled basis. For example, two weeks after an omnibus channel file is recorded, the omnibus channel file may be deleted. By automatically deleting omnibus channel files after a period of time, the total amount of storage space necessary for channel array storage arrangement 332 may be determined accurately. For example, if it is known when omnibus channel files will be deleted, and it is known how many and for how long omnibus channel files will be recorded, a necessary amount of storage space may be allocated to channel array storage arrangement 332.

During the period of time in which omnibus channel files are stored by the channel array storage arrangement 332, a user may have the ability to watch any of the television programs stored within omnibus channel files. Following the period of time during which the omnibus channel files are stored, only individual television programs specifically indicated by a user to be designated for saving may be preserved; other television programs that are part of the omnibus channel file may be deleted. Referring to omnibus channel file 344, the user may select a television program 339 for preservation. This may result in a flag, such as a single bit for example, being set within the catalog database 330 that indicates the television program is to be saved when the omnibus channel file is deleted. As an example of a reason why a user may choose to preserve the television program 339, the television program 339 may be part of a series which the user enjoys watching but the user did not have a chance to view while the television program 339 was stored by the channel array storage arrangement 332. The user may designate the television program 339 for saving via an EPG interface (e.g., EPG 202). The user may have marked the specific episode corresponding to television program 339 for saving or may have selected the entire series of which the television program 339 is an episode for saving.

When omnibus channel file array 342 is to be deleted, the television program 339 may be transferred from the channel array storage arrangement 310 to the user-assigned storage arrangement 334. In general, the content management engine 118 may manage this process. The dotted arrow of FIG. 4 is intended to illustrate how the television program 339 becomes a particular individual television program file 346e of a plurality of individual television program files 346a-e within the user-assigned storage arrangement 334. The user-assigned storage arrangement 334 may be a separate storage arrangement, such as a separate storage device partition, on which the user is permitted to allocate storage space as desired. Other embodiments are possible. As such, the television programs stored by the user-assigned storage arrangement 334 may be determined by a user. For example, a user may be permitted to store as many television programs to the user-assigned storage arrangement 334 as desired until the user-assigned storage arrangement 334 no longer has capacity to store programs. Once full, the user may be required to delete content from the user-assigned storage arrangement 334 before storing other content to the user-assigned storage arrangement 334.

When a television program is transferred to the user-assigned storage arrangement 334, the catalog database 330 may need to be updated such that the television program can be located. Entries corresponding to deleted omnibus channel files may be deleted from the catalog database 330. A new entry for a television program transferred to the user-assigned storage arrangement 334 may be made, or the previous entry for the television program may be modified. Table 4 below illustrates an example of a modified portion of the catalog database 330 for television program 339 after being transferred to the user-assigned storage arrangement 334.

TABLE 4

| PID | File Name | File Offset (bytes) | Marked for Save? |
|---|---|---|---|
| ~~2738239~~ | ~~es2738239.tsp~~ | ~~0~~ | ~~No~~ |
| 9034836 | es9034836.tsp | 0 | Yes |
| ~~4854557~~ | ~~es1003293.tsp~~ | ~~10239832~~ | ~~No~~ |
| ~~1122092~~ | ~~es1122092.tsp~~ | ~~0~~ | ~~No~~ |

In Table 4, it is assumed that television program identifier 9034836 corresponds to the television program 339. The entries associated with television program identifier "2738239," "4854557," and "1122092" may be deleted due to deletion of the corresponding omnibus channel files from the channel array storage arrangement 332, where such deletions are indicated by strikethrough in Table 4. However, the entry corresponding to the television program 339 is maintained with the filename and file offset being updated for the television program-specific file in which the television program is now stored. As such, as omnibus channel files are created, stored, and deleted, and as individual television program files are created, stored and deleted, the catalog database 330 may be updated such that each television program has an entry. In particular, television programs stored in omnibus channel files and television programs stored in individual program files each have entries.

Once a copy of the television program 339 has been transferred to the user-assigned storage arrangement 334, the omnibus channel file 344 may be deleted. However, the individual television program file 346e may be created and stored on the user-assigned storage arrangement 334. For example purposes only, four other television programs are illustrated as stored by the user-assigned storage arrangement 334. Each of individual television program files 346a-e is associated with a separate file. As such, each television program-specific file of the individual television program files 346a-e are intended to store a single television program from start to finish. It should be understood that due to recording scheduling, a short period of time of another television program, and possible commercials, may be stored at the beginning and/or end of a television program specific file. Likewise, a short period of time of the television program desired to be recorded may fail to be recorded at the beginning or end of the recording of the television program. While the channel array storage arrangement 332 may store channel-specific files, the user-assigned storage arrangement 334 may store television program-specific files. Once a television program, such as individual television program file 346e, is stored on the user-assigned storage arrangement 334, the television program may be stored indefinitely until the television program is selected for deletion by a user.

The above description in connection with FIG. 4 represents a situation where the PTR 110 is enabled to record arrays of television channels, such as on a nightly basis. It should be understood that a user may disable such recording. If disabled, a user may still select individual television programs for recording. Such individual television programs selected for recording may be recorded directly to the user-assigned storage arrangement 334 into individual television program files. In some embodiments, if a user has disabled television channel array recording, physical memory allocated to the channel array storage arrangement 332 may be reassigned and used for other storage, such as for storage of additional user selected television programs. In some embodiments, when array recording is disabled the channel array storage arrangement 332 may be removed, if a partition, with the space reallocated to the user-assigned storage arrangement 334 or some other storage arrangement. Alternatively, the channel array storage arrangement 332 may remain unused. Still other embodiments are possible.

Further details associated with extracting a particular television program from an omnibus channel file is discussed within U.S. Nonprovisional patent application Ser. No. 13/793,636, filed on 11 Mar. 2013, entitled "TRANSFER OF TELEVISION PROGRAMS FROM CHANNEL-SPECIFIC FILES TO PROGRAM-SPECIFIC FILES," the entirety of which is hereby incorporated by reference for all intents and purposes.

Figure 5:
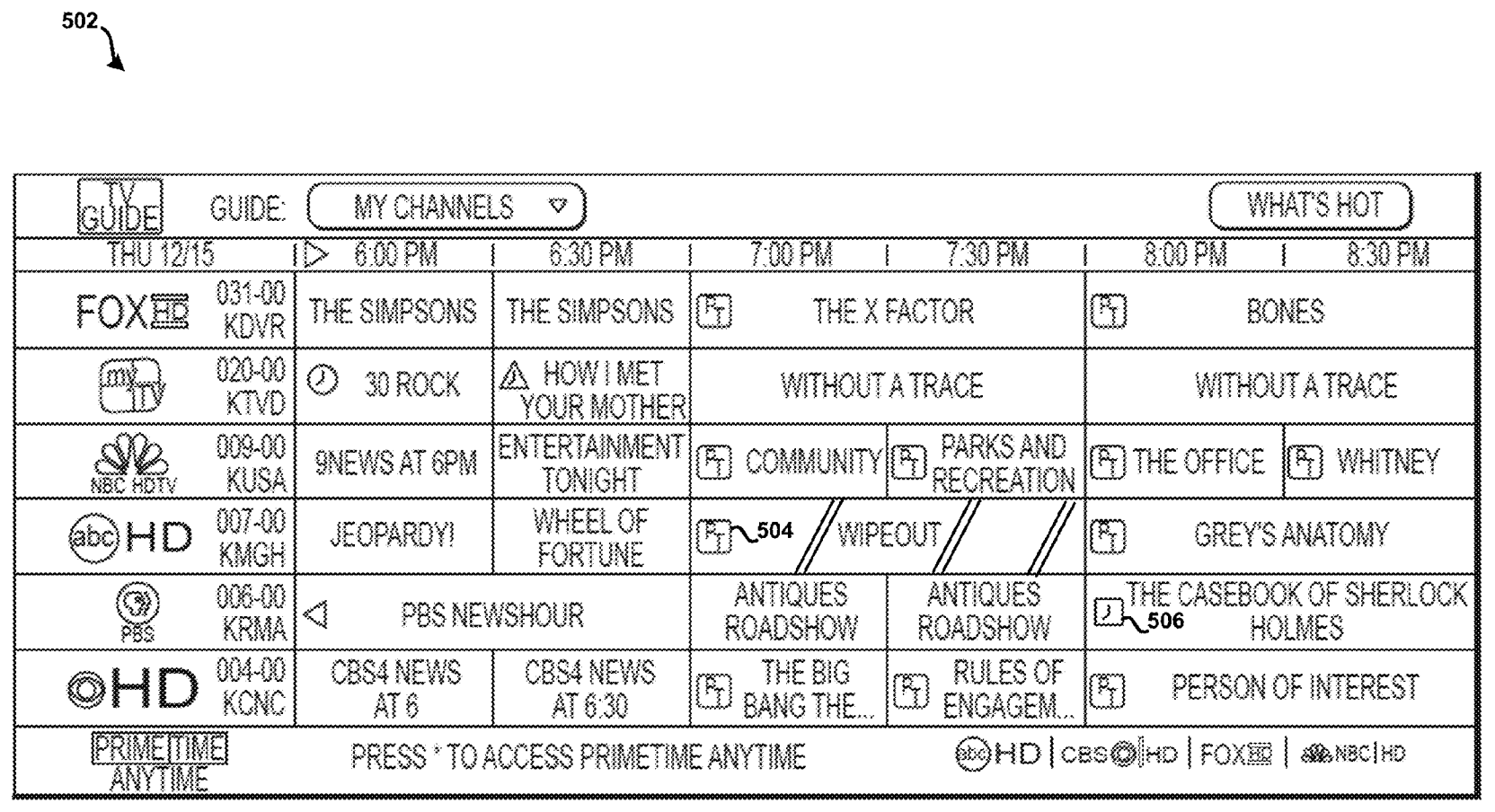

Referring now to FIG. 5, a first example EPG 502 is shown in accordance with the principles of the present disclosure. In many respects, the EPG 502 is similar to the EPG 202 described above in connection with FIG. 2. For example, the EPG 502 may at least present various information related to television channels and the timing of programs or programming appearing on such television channels. For example, the EPG 502 may display channel information associated with a channel "7" that is associated with the ABC network, where a show "Wipeout" is listed as scheduled to appear on channel "7" during a particular time period "7-8 PM" of a particular day "Thursday 12/15," etc. In this example, and assuming that a current time is sometime during the time period "7-8 PM" on "Thursday 12/15," a user may manipulate a pointing device (not shown) to "arrow up" or "arrow down" or "arrow right" or "arrow left" and select the show "Wipeout" for immediate viewing, such as via manipulation of a D-pad or control pad of a remote control. In this example, a "block" or "cell" within the EPG 502 that is associated with the show "Wipeout," as shown by simplified cross-hatch in FIG. 5, may correspond to a user-selectable icon that when "selected," "activated," etc., may initiate a process by which the show "Wipeout" would be output for immediate display or presentation on a display device, such as the television 114c of FIG. 2 for example.

In FIG. 5, a first graphical indicator 504 is displayed within the "block" that is associated with the show "Wipeout." In this example, the first graphical indicator type 504 may indicate, designate, identify, etc., that the show "Wipeout" is associated with an "array" recording timer, such as the particular "Timer PTAT" described above in connection with FIG. 2 for example. An "array" recording timer is distinguished from a "user-initiated" recording timer because timing of an "array" recording timer may be set or established by an entity other than a typical user, such as by a service provider for example. For example, the service provider 102 of FIG. 2 may define a particular "array" recording timer to at least record television Primetime of the ABC network from 7-10 PM on weeknights, etc. In this example, the first graphical indicator type 504 would not only be displayed within the "block" that is associated with the show "Wipeout," but also within a "block" that is associated with the show "Grey's Anatomy," such as shown in FIG. 5. Other embodiments are possible.

In contrast, timing of a particular "user-initiated" recoding timer may be set or established by a typical user. For example, a particular user may define a particular "user-initiated" recording timer to record a show "The Casebook of Sherlock Holmes," which is listed within the EPG 502 as scheduled to appear on a channel "6" during a particular time period "8-9 PM" of the particular day "Thursday 12/15." In this example, a second graphical indicator type 506 displayed within a "block" that is associated with the show "The Casebook of Sherlock Holmes" may indicate, designate, identify, etc., that the show "The Casebook of Sherlock Holmes" is associated with the particular "user-initiated" recording timer.

As may be understood from the preceding discussion, a particular "indication" may be displayed within the EPG 502 for television programs that are specified by a user to be recorded, such as a television program subject to a "user-initiated" recording timer. For example, as shown in FIG. 5, the second graphical indicator type 506 may indicate that a user has individually selected "The Casebook of Sherlock Holmes" program for recording. In contrast, a different particular "indication" may be displayed for television programs that are specified by an entity other than a particular user to be recorded, such as a television program subject to an "array" recording timer. For example, the first graphical indicator type 504 may indicate that the show "Wipeout" has been selected, along with at least the show "Grey's Anatomy," for recording by a service provider as part of a PTAT (Prime Time Any Time) service. In some scenarios, however, both the first graphical indicator type 504 and the second graphical indicator type 506 may be displayed within the EPG 502 in association with a particular television program. In this example, the particular television program may be subject to recording as part of "array" of television channels, and also in accordance with a "user-initiated" timer.

Figure 6:
FIG. 6 shows the programming guide of FIG. 5 with first and second graphical indicators associated with a particular program.

For example, referring now to FIG. 6, the EPG 502 of FIG. 5 is shown with first and second graphical indicators associated with a particular program. In particular, the first graphical indicator type 504 is displayed within the "block" that is associated with the show "Wipeout." As mentioned above, the first graphical indicator type 504 may indicate, designate, identify, etc., that the show "Wipeout" is associated with an "array" recording timer, such as the particular "Timer PTAT" described above in connection with FIG. 2 for example. Further, the second graphical indicator type 506 is displayed within the "block" that is associated with the show "Wipeout." In this example, the second graphical indicator type 506 may indicate that a user has individually selected "Wipeout" program for recording. As an example of a reason why a user may choose to record the show "Wipeout" in accordance with a "user-initiated" timer, even though the show "Wipeout" is subject to recording in accordance with an "array" recording timer, is that the show "Wipeout" may be recorded as an "omnibus channel file" upon activation or "firing" of the "array" recording timer, where this file may "age-out" and be deleted after a predetermined period of time, as described above in connection with FIGS. 1-4. The user may choose to record the show "Wipeout" in accordance with a "user-initiated" timer when interested in preserving the subject instance of the show "Wipeout," such that this show may be available for viewing following passage of the predetermining period of time. Other reasons may be possible as well.

In example embodiments, the first graphical indicator type 504 may generally be visually distinct or distinguished from the second graphical indicator type 506. This may manifest as a difference between at least one visually perceivable trait of the first graphical indicator type 504 and the second graphical indicator type 506. For example, in one embodiment, at least a portion of the first graphical indicator type 504 may exhibit coloring different than coloring of the second graphical indicator type 506. For example, the first graphical indicator type 504 may be perceived as being substantially "yellow," whereas the second graphical indicator type 506 may be perceived as being substantially "green." In another embodiment, a geometric shape of the first graphical indicator type 504 may be different than a geometric shape of the second graphical indicator type 506. For example, the first graphical indicator type 504 may be perceived as being substantially "circular," whereas the second graphical indicator type 506 may be perceived as being substantially "rectangular."

In another embodiment, a geometric size of the first graphical indicator type 504 may be different than a geometric size of the second graphical indicator type 506. For example, the first graphical indicator type 504 may be perceived as being substantially "twice" the size than that perceived of the second graphical indicator type 506. In another embodiment, the first graphical indicator type 504 may exhibit symbols and/or indicia different than symbols and/or indicia of the second graphical indicator type 506. For example, as shown in FIG. 6, the first graphical indicator type 504 may exhibit indicia "$P_T$," which may stand for "PTAT," whereas the second graphical indicator type 506 may exhibit indicia best described as corresponding to "hands on a clock face."

Other embodiments of the first graphical indicator type 504 and the second graphical indicator type 506 are possible. Further, visual properties of specific instances of the first graphical indicator type 504 and the second graphical indicator type 506 may be distinct from visual properties of other specific instances of the first graphical indicator type 504 and the second graphical indicator type 506.

For example, in some embodiments, coloring of the second graphical indicator type 506 may be a function of or associated with a particular profile of a customer account of the service provider 102 of FIG. 1. For example, the first graphical indicator type 504 when perceived as substantially "green" may refer to or otherwise indicate that an associated timer was "set" by a particular user associated with a "User Profile 1," whereas the second graphical indicator type 506 when perceived as being substantially "purple" may refer to or otherwise indicate that an associated timer was "set" by a particular user associated with a "User Profile 2." For example, the second graphical indicator type 506 as displayed within the "block" that is associated with the show "Wipeout" in FIG. 6 may be envisioned as being substantially "green," where the timer associated with this particular instance of the second graphical indicator type 506 may have been set by a particular user associated with the "User Profile 1." In contrast, the second graphical indicator type 506 as displayed within the "block" that is associated with the show "Grey's Anatomy" in FIG. 6 may be envisioned as being substantially "purple," where the timer associated with this particular instance of the second graphical indicator type 506 may have been set by a particular user associated with the "User Profile 2." Other embodiments are possible. For example, a "shape" of the second graphical indicator type 506 may be used to associate of identify a particular recording timer with a particular user or user profile. Still other embodiments are possible. For example, coloring of the second graphical indicator type 506 may be a function of or associated with a particular tuner used for recording of an associated program. For example, "tuner 1" may be associated with the color "red," "tuner 2" may be associated with the color "purple," and etc. Still other embodiments are possible.

Figure 7:
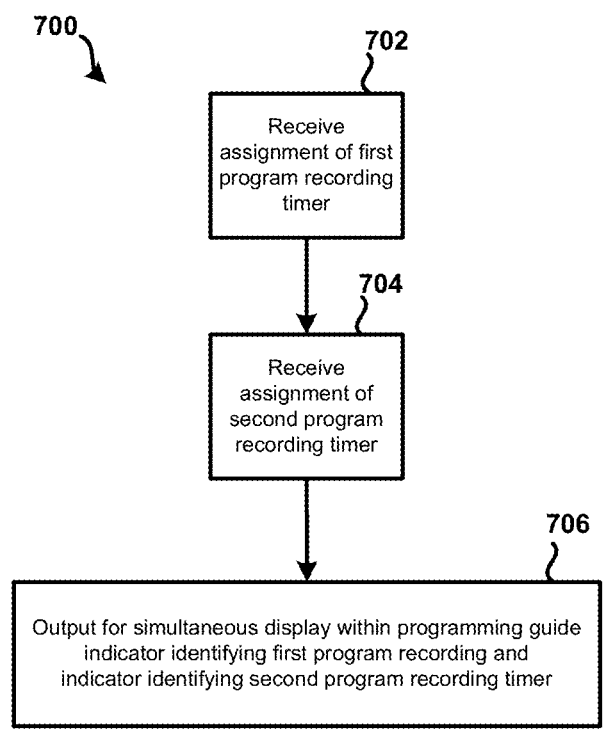
FIG. 7 shows a first example method in accordance with the present disclosure.

Referring now to FIG. 7, a first example method 700 is shown in accordance with the present disclosure. In general, steps or modules of the method 700 as described may ultimately be implemented by or on the PTR 110 of FIG. 1. Other embodiments are however possible. For example, one or more modules or steps of the method 700 may be implemented by or on one or more of the other respective devices or components within the system 100 as described above in connection with FIG. 1. Still other embodiments are possible.

At 702, a first program recording timer may be scheduled or defined to record a particular program broadcast on a television channel at a particular time by a television service provider. For example, a user may define a "user-initiated" recording timer to record the show "Wipeout," which as shown in FIG. 6 is listed within the EPG 502 as scheduled to appear on a channel "7" during the time period "7-8 PM" of the day "Thursday 12/15." In general, the first program recording timer may be defined, at least sometime prior broadcast of the show "Wipeout," by the user via interaction with the icon 206 such as described above in connection with FIG. 2. Other embodiments are however possible. For example, the icon 206 need not necessarily be selected using the cursor 204. Rather, the particular user may navigate and select elements within the EPG 202 (or EPG 502) via any desired means for interacting with a menu-driven interface (e.g., voice activation, motion activation, control pad, etc.).

At 704, a second program recording timer may be scheduled to record a plurality of programs broadcast consecutively on the television channel by the television service provider, including the particular program. For example, a user may select the icon 210 to set a particular "Timer PTAT" to automatically record television Primetime for later viewing, such as described above in connection with FIG. 2. In this example, the "Timer PTAT" may be predefined to, when selected, at least record television Primetime of the ABC network from 7-10 PM weeknights, etc. For example, this may corresponded to at least recording the show "Wipeout" and the show "Grey's Anatomy" as shown in FIG. 5. In this manner, at least the show "Wipeout" may be associated with both the first program recording timer and the second program recording timer. Other embodiments are possible. For example, the "Timer PTAT" may be predefined to, when selected, record television "Primetime" from 7 PM to 10 PM on the NBC, ABC, CBS, and FOX networks each weeknight. Still other embodiments are possible. However, at least the show "Wipeout" may still be associated with the first program recording timer and the second program recording timer.

At 706, a first graphical indicator that identifies scheduling of the first program recording timer, and a second graphical indicator that identifies scheduling of the second program recording timer may be output simultaneously for display within a programming guide and in association with a descriptor of the particular program. For example, as shown in FIG. 6 and in continuing with the example described at 702 and 704, the first graphical indicator type 504 and the second graphical indicator type 506 may be displayed within the "block" or "cell" that is associated with the show "Wipeout." A descriptor of the show "Wipeout" may in one embodiment refer to the textual characters or letters within the word "Wipeout." The first graphical indicator type 504 may indicate, designate, identify, etc., that the show "Wipeout" is associated with the second recording timer, an "array" recording timer, and the second graphical indicator type 506 may indicate, designate, identify, etc., that the show "Wipeout" is associated with the first recording timer, a "user-initiated" timer. Such an implementation may be beneficial in many respects. For example, at a quick glance, a user may be informed or otherwise determine that at least the show "Wipeout" will not be "aged-out" or deleted without the user having the chance to watch the subject instance of the show "Wipeout." Rather, the subject instance of the show "Wipeout" may be preserved (e.g., stored on the PTR 110) until such a time when the user intends to delete the subject instance of the show "Wipeout" for example. Other benefits and/or advantages are possible as well.

For example, another advantage of a user record indicator in addition to a channel array record indicator may include the following. In certain instances, when a user sets up his own recording, a user record indicator may be displayed within a "block" or "cell" associated with the program to be recorded in an EPG. Whenever the user wants to ensure it is set up to record, the user may access the EPG where this is clearly indicated. However, when the user looks for this confirmation for his initiated recording on an EPG cell that is also marked for a channel array recording, the lack of the user recording indicator is confusing since in certain instances, the user recording indicator shows that the recording is scheduled. So, the user may starts to second guess, and may try to either set up the recording again, or has to go through a menu key sequence for finding the timer in a timer list to determine whether the recording is actually scheduled. Having user record indicators displayed with channel array record indicators may eliminate or prevent confusion, arduous confirmation, etc., and is consistent with the use of this indicator everywhere else in the EPG. Still other benefits and/or advantages are possible as well.

Referring now to FIG. 8, a second example EPG 802 is shown in accordance with the principles of the present disclosure. In many respects, the EPG 802 is similar to at least the EPG 502 described above in connection with FIGS. 5-7. For example, the EPG 802 may at least present various information related to television channels and the timing of programs or programming appearing on such television channels. For example, the EPG 802 may display channel information associated with a channel "6" that is associated with the PBS network, where a show "Washington Week" is listed as scheduled to appear on channel "6" during a particular time period "7-7:30 PM" of a particular day "Thursday 3/3," etc. In this example, and assuming that a current time is sometime during the time period "7-7:30 PM" on "Thursday 3/3," a user may manipulate a pointing device (not shown) to "arrow up" or "arrow down" or "arrow right" or "arrow left" and select the show "Washington Week" for immediate viewing, such as via manipulation of a D-pad or control pad of a remote control. In this example, a "block" or "cell" within the EPG 802 that is associated with the show "Washington Week," as shown by stipple-like shading in FIG. 8, may correspond to a user-selectable icon that when "selected," "activated," etc., may initiate a process by which the show "Washington Week" would be output for immediate display or presentation on a display device, such as the television 114c of FIG. 2 for example.

In the example of FIG. 8, the channel "6" may not be a network channel that is associated with an "array" recording timer. Rather, the channel "4" that is associated with the CBS network may be a channel that is associated with a particular "array" recording timer, and the channel "7" that is associated with the ABC network may be a channel that is associated with the particular "array" recording timer, and the channel "9" that is associated with the NBC network may be a channel that is associated with the particular "array" recording timer, and the channel "31" that is associated with the FOX network may be a channel that is associated with the particular "array" recording timer. This may correspond to the scenario where, for example, during weekday Primetime hours, all of the "major" networks may be simultaneously recorded for the same period of time, such as from 7-10 PM. This may be designated within the EPG 802 using the first graphical indicator type 504 as discussed above. For example, the first graphical indicator type 504 may be displayed adjacent a descriptor that identifies a particular one of the television channels 4, 7, 9, and 31. A descriptor may in one embodiment may refer to textual characters, or letters, or a word, that identifies a particular one of the television channels 4, 7, 9, and 31. Such as the word "FOX" as shown in FIG. 8. A descriptor may in one embodiment may refer to a logo that identifies a particular one of the television channels 4, 7, 9, and 31. Such as the "eye" logo of the CBS channel 4 as shown in FIG. 8.

In accordance with the present disclosure, the EPG 802 may allow, permit, or enable a user to navigate within the EPG 802 to view programming that was recorded as part of the particular "array" recording timer, and/or programming that was recorded as part of an "user-initiated" recording timer. For example, and as discussed further below. A user may navigate "backwards" through the EPG 802, or from right to left within the EPG 802, where particular "blocks" or "cells" may be activated for selection when a particular program is currently stored, such as by the PTR 110 for example, to access the particular program, while other "blocks" or "cells" may be inactive so as to not be available for selection. A user may then select recorded programming for viewing directly from within the EPG 802. Such an implementation may be beneficial in many respects. For example, a user may access recorded programming directly from the EPG 802, without having to navigate to a separate interface. This may provide for a more "streamlined" user experience, adding value to the business product that is the EPG 802 (and EPG 202 and EPG 502). Other benefits and/or advantages are possible as well.

For example, with reference to use of a user recording indicator even in a "look back" EPG scenario, where PTAT recording are indicated in the EPG in cells before the present time. A user may want to use the same indications used elsewhere to ensure that the user recording is in place without confusion, arduous menu navigation to confirm, and consistency with its use elsewhere in an EPG. However, given that events shown in the past are actual recordings and are not timers for future recording timers, it may follow that the perhaps recordings indicators should change from an icon that indicates that a recording has already happened, distinguished from a recording that will happen in the future. So, it is contemplated that instead of a user "recording" icon, a user saved icon may be used in some embodiments.

In at least one embodiment, the EPG 802 may collapse based on filtering of channels associated with recorded programming. For example, the EPG 802 may show channels 1-31 for live viewing, and the channels 4, 7, 9, and 31 may be associated with a "stored content service," such as a service that implements an "array" recording timer. As the user moves "backwards" in the EPG 802, such as from right to left within the EPG 802 where only movement from left to right may typically be permitted, the EPG 802 may collapse down and show just channels 4, 7, 9, and 31. Furthermore, in at least one embodiment, the EPG 802 may only show time periods backwards in time associated with time periods in which content was recorded, either as part of the stored content service or generally recorded by the content receiver. For example, the EPG 802 may move backwards in time through Primetime blocks for each night, and may not have any data associated with other time blocks. An example of allowing a user to view programming that was recorded as part of an "array" recording timer, and/or programming that was recorded as part of an "user-initiated" recording timer, along with various collapsing, filtering, and/or presentation of channels and content, may be understood from the following discussion in connection with FIGS. 9-13.

Figure 9:
FIG. 9 shows the programming guide of FIG. 8 in a first modified state.
Figure 11:
FIG. 11 shows the programming guide of FIG. 8 in a third modified state.

For example, referring now to FIG. 9, the EPG 802 of FIG. 8 is shown in a first modified state. In particular, as a user navigates the EPG 802 to move from the "block" or "cell" associated with the show "Washington Week," as shown in FIG. 8, to the "block" or "cell" associated with the show "Wipeout," a selectable icon 804 may "pop-up" or otherwise appear that may provide the user an option to access one or more particular recorded programs. In general, the recorded programs may have been recorded as part of an "array" recording timer, and/or recorded as part of an "user-initiated" recording timer.

Figure 10:
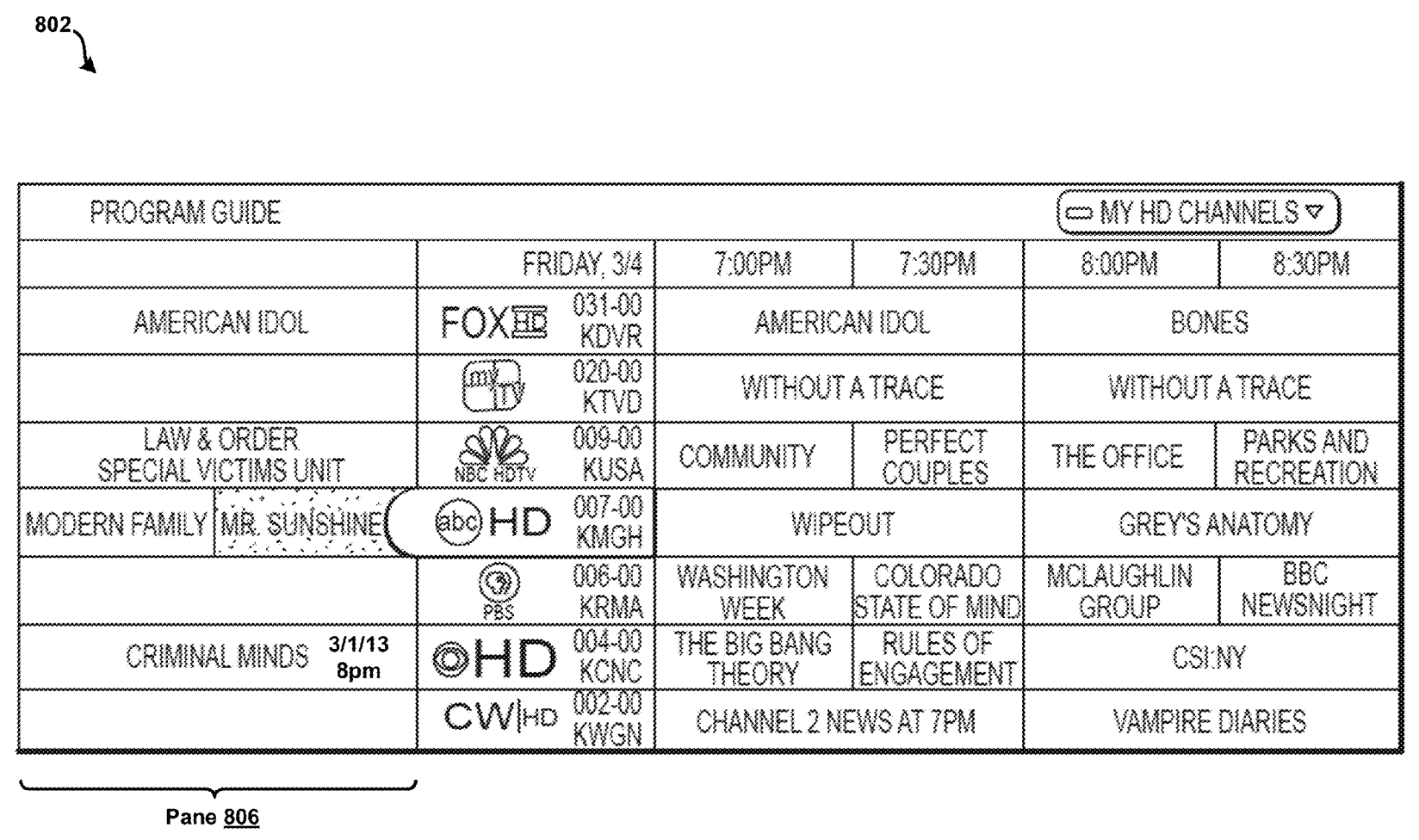

For example, referring now to FIG. 10, the EPG 802 of FIG. 8 is shown in a second modified state. In particular, a user may select the selectable icon 804 and a pane 806 may be presented within the EPG 802 that allows the user to select programs that are currently stored and available for viewing. As mentioned above, the programs may have been recorded as part of an "array" recording timer, and/or recorded as part of an "user-initiated" recording timer. Further, the programs may be organized in any manner as desired. In the example of FIG. 10, particular programs may be presented within the pane 806 "in-line" with a corresponding channel on which the programs were originally broadcast. For example, the show "Mr. Sunshine" may be presented within the pane 806 "in-line" with the channel "7" that is associated with the ABC network, and etc. In this example, as the pane 806 was accessed via selection of the selectable icon 804 which is associated with the channel "7," a particular "cell" or "block" associated with the content "Mr. Sunshine" may be initially "highlighted," as shown by stipple-like shading in FIG. 10. Here, the particular "cell" or "block" associated with the content "Mr. Sunshine" may correspond to a user-selectable icon that when "selected," "activated," etc., may initiate a process by which the particular instance of the show "Mr. Sunshine" would be output for immediate display or presentation on a display device, such as the television 114c of FIG. 2 for example.

Other embodiments of the pane 806, or features or elements within the pane 806, are possible as well. For example, particular programs may be presented within the pane 806 according to a "time" of original broadcast. In this example, the pane 806 may be substantially similar to a format of the EPG 802 as shown at least in FIGS. 8-9, where particular programs are listed or otherwise organized according to time and channel. Still other embodiments are possible. For example, particular programs may be presented within the pane 806 "in-line" with a corresponding channel on which the programs were originally broadcast, yet may include further information within a particular "cell" or "block" in addition to a descriptor (e.g., "Mr. Sunshine") that identifies a particular show. For example, the show "Mr. Sunshine" may be presented within the pane 806 "in-line" with the channel "7" that is associated with the ABC network, and further the "cell" associated with the show "Mr. Sunshine" may specify a date/time of the original airing, similar to that shown for the show "Criminal Minds" in FIG. 10.

Still other embodiments are possible that may allow a user to view programming that was recorded as part of an "array" recording timer, and/or programming that was recorded as part of an "user-initiated" recording timer, along with various collapsing, filtering, and/or presentation of channels and content. For example, referring now to FIG. 11, the EPG 802 of FIG. 8 is shown in a third modified state. In particular, a filter picklist 808 may be selected within the EPG 802 to "collapse" the EPG 802 to show only those channels that are assorted with the particular "array" recording timer discussed above in connection with FIGS. 8-10, channels 4, 7, 9, and 31.

Still other embodiments are possible. For example, referring now to FIG. 12, the EPG 802 of FIG. 8 is shown in a fourth modified state. The scenario of FIG. 12 may be similar to that of the scenario described above in connection with FIGS. 8-9. For example, as a user navigates the EPG 802 to move from the "block" or "cell" associated with the show "Washington Week," as shown in FIG. 8, to the "block" or "cell" associated with the show "Wipeout," a selectable icon 1202 may "pop-up" or otherwise appear that may provide the user an option to access one or more particular recorded programs. In this example, however, the one or more particular recorded programs may be associated only with the network associated with channel "7." For example, the shows "The Bachelor" and "Dancing with the Stars" and etc., are shows provided by the ABC network.

In one embodiment, a user may select the selectable icon 1202 and a pane 1204 may be presented within the EPG 802 that allows the user to select programs that are currently stored and available for viewing. Shows that have more than one (1) recorded show available for viewing might by "highlighted" within the pane 1204 to distinguish from other shows that may have only one (1) recorded show available for viewing. For example, as shown in FIG. 12, a "bold" line may frame a selectable icon associated with the show "The Middle" to indicate that more than one episode of the show "The Middle" is available for viewing. Further, in the example of FIG. 12, the pane 1204 may correspond to a "drop-down" menu that may display programs that are currently stored and available for viewing. Here, the particular "cell" or "block" associated with the content "The Middle" may correspond to a user-selectable icon that when "selected," "activated," etc., may initiate a process by which a particular instance of the show "The Middle" would be output for immediate display or presentation on a display device, such as the television 114c of FIG. 2 for example. The particular instance of the show "The Middle" may correspond to an "earlier" show in the series when multiple recordings exist so as to prevent viewing of the series "out of sequence." Other embodiments are possible.

Figure 13:
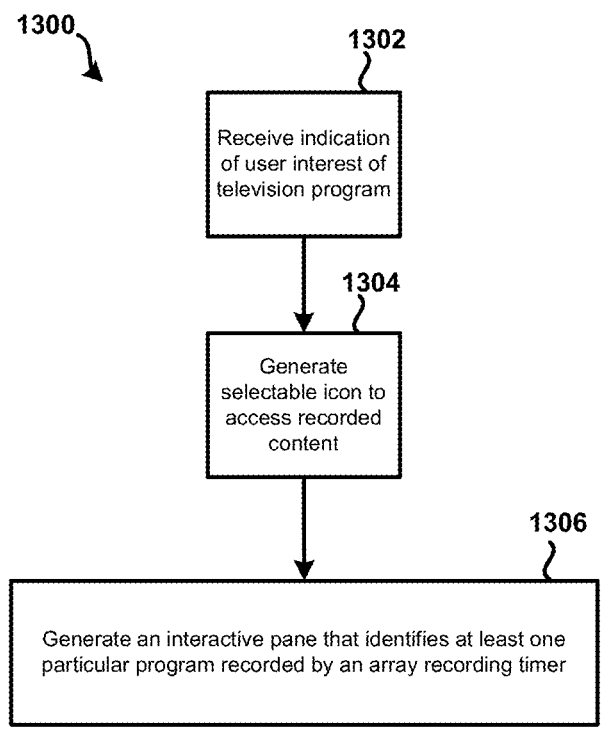
FIG. 13 shows a second example method in accordance with the present disclosure.

Referring now to FIG. 13, a second example method 1300 is shown in accordance with the present disclosure. In general, steps or modules of the method 1300 as described may ultimately be implemented by or on the PTR 110 of FIG. 1. Other embodiments are however possible. For example, one or more modules or steps of the method 1300 may be implemented by or on one or more of the other respective devices or components within the system 100 as described above in connection with FIG. 1. Still other embodiments are possible.

At 1302, an indication of user interest of a television program of a particular television channel may be received within a programming guide that displays particular content and, at 1304, a user-selectable icon positioned in association with a descriptor that identifies the particular television channel may be generated and displayed with the programming guide in response to the indication of user interest and for display within the programming guide.

In general, the indication of user interest may correspond to access of a particular cell within the programming guide associated with the television program. For example, referring now additionally to FIG. 9, as a user navigates the EPG 802 to move from the "block" or "cell" associated with the show "Washington Week" to the "block" or "cell" associated with the show "Wipeout," the selectable icon 804 may "pop-up" or otherwise appear that may provide the user an option to access one or more particular recorded programs. In this example, the channel "7," which is associated with the ABC network, may be a channel that is associated with a particular "array" recording timer in which, during weekday Primetime hours, programming of all of the "major" networks may be simultaneously recorded for the same period of time, such as from 7-10 PM. In example embodiments, the selectable icon 804 may not be generated as, or when, or if, a user navigates the EPG 802 to move from the "block" or "cell" associated with the show "Wipeout" to the "block" or "cell" associated with the show "Washington Week." This may be because the channel "6," which is associated with the PBS network, may be a channel that is not associated with the particular "array" recording timer. However, other embodiments are possible.

At 1306, an interactive pane that identifies at least one particular program that is stored within an omnibus channel file containing a plurality of programs broadcast consecutively on the particular television channel over a predefined period of time may be generated for display within the programming guide upon selection of the user-selectable icon. In general, such a recording may be implemented by an "array" recording timer, such as the "Timer PTAT" that may be predefined to, when selected, record television Primetime from 7 PM to 10 PM on the NBC, ABC, CBS, and FOX networks each weeknight as described above in connection with FIG. 2.

For example, referring now additionally to FIG. 10, a user may select the selectable icon 804 and the pane 806 may be presented within the EPG 802 that allows the user to select programs that are currently stored and available for viewing. In this example, the pane 806 is disconnected from or disjoint from conventional content of the EPG 802 by a column comprising descriptors that identify the particular television channels 2, 4, 6, 7, 9, 20, and 31. In other words, content within the pane 806 is separate or separated from conventional content of the EPG 802. For example, the "block" or "cell" associated with the show "Mr. Sunshine" is separated from the "block" or "cell" associated with the show "Wipeout." This is because the "block" or "cell" continuing the descriptor(s) that identifies the particular television channel "7" is in-between the "block" or "cell" associated with the show "Wipeout" and the "block" or "cell" associated with the show "Mr. Sunshine." Other embodiments are possible.

For example, referring now additionally to FIG. 12, a user may select the selectable icon 1202 and the pane 1204 may be presented within the EPG 802 that allows the user to select programs that are currently stored and available for viewing. In this example, the pane 1204 is integrated or incorporated within conventional content of the EPG 802. This is different than the example scenario described above in connection with FIG. 10. In other words, content within the pane 1204 is not separate or separated from conventional content of the EPG 802. For example, the "block" or "cell" associated with the show "The Bachelor" is immediately adjacent the "block" or "cell" associated with the show "Wipeout." Such an implementation as described in connection with both FIG. 10 and FIG. 12 may be beneficial in many respects. For example, a user may access recorded programming directly from the EPG 802, without having to navigate to a separate interface. This may provide for a more "streamlined" user experience, adding value to the business product that is the EPG 802 (and EPG 202 and EPG 502). Other benefits and/or advantages are possible as well.

For example, like the PTAT option to view other PTAT recordings when a PTAT EPG cell is selected, a similar approach could be taken when a cell is marked for user indicated recording. For example, when a cell for a user initiated recording is selected, a row of previous recorded episodes may be presented of the same series as the episode represented in the cell, in case a user may not want to wait for the recording, and instead instantly watch a past recording of another episode in the series. For example, when an EPG cell for Wipeout episode 4 is selected, a row of Wipeout episodes 1, 2, and 3 cells pop out from below the row with Wipeout episode 4. The cells for recorded episodes 1-3 could also be marked with "%" watched indicators to mark which shows have been previously viewed or not. When the user selects a cell from among the recorded episodes 1-3 cells, that episode will immediately play. Still other benefits and/or advantages are possible as well.

Figure 14:
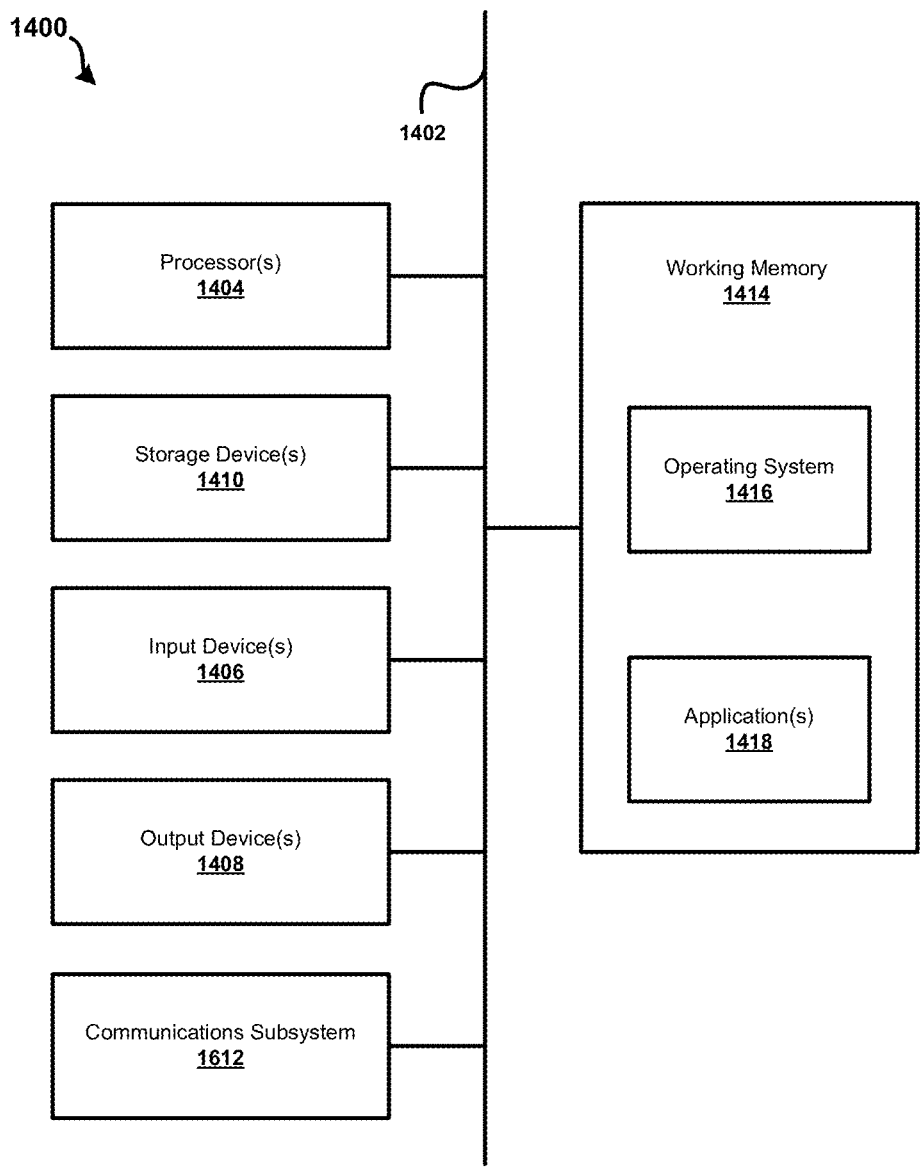
FIG. 14 shows an example computing system or device.

FIG. 14 shows an embodiment of an example computer system or device 1400 in accordance with the present disclosure. An example of a computer system or device includes an enterprise server, blade server, desktop computer, laptop computer, personal data assistant, smartphone, gaming console, set-top-box, and any other type of machine for performing calculations. The computer system 1400 may be wholly or at least partially incorporated as part of previously-described computing devices, such as the PTR 110, the secondary television receivers 112*a-b*, the televisions 114*a-c*, and the computing devices 116*a-b* of FIG. 1. The example computer device 1400 may be configured to perform and/or include instructions that, when executed, cause the computer system 1400 to perform the method of FIG. 7 and FIG. 13. The example computer device 1400 may be configured to perform and/or include instructions that, when executed, cause the computer system 1400 to instantiate and implement functionality of the content management engine 118.

The computer device 1400 is shown comprising hardware elements that may be electrically coupled via a bus 1402 (or may otherwise be in communication, as appropriate). The hardware elements may include a processing unit with one or more processors 1404, including without limitation one or more general-purpose processors and/or one or more special-purpose processors (such as digital signal processing chips, graphics acceleration processors, and/or the like); one or more input devices 1406, which can include without limitation a remote control, a mouse, a keyboard, and/or the like; and one or more output devices 1408, which can include without limitation a presentation device (e.g., television), a printer, and/or the like.

The computer system 1400 may further include (and/or be in communication with) one or more non-transitory storage devices 1410, which can comprise, without limitation, local and/or network accessible storage, and/or can include, without limitation, a disk drive, a drive array, an optical storage device, a solid-state storage device, such as a random access memory, and/or a read-only memory, which can be programmable, flash-updateable, and/or the like. Such storage devices may be configured to implement any appropriate data stores, including without limitation, various file systems, database structures, and/or the like.

The computer device 1400 might also include a communications subsystem 1412, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 1412 may permit data to be exchanged with a network (such as the network described below, to name one example), other computer systems, and/or any other devices described herein. In many embodiments, the computer system 1400 will further comprise a working memory 1414, which may include a random access memory and/or a read-only memory device, as described above.

The computer device 1400 also can comprise software elements, shown as being currently located within the working memory 1414, including an operating system 1416, device drivers, executable libraries, and/or other code, such as one or more application programs 1418, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1410 described above. In some cases, the storage medium might be incorporated within a computer system, such as computer system 1400. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 1400 and/or might take the form of source and/or installable code, which, upon compilation and/or installation on the computer system 1400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 1400) to perform methods in accordance with various embodiments of the invention. According to a set of embodiments, some or all of the procedures of such methods are performed by the computer system 1400 in response to processor 1404 executing one or more sequences of one or more instructions (which might be incorporated into the operating system 1416 and/or other code, such as an application program 1418) contained in the working memory 1414. Such instructions may be read into the working memory 1414 from another computer-readable medium, such as one or more of the storage device(s) 1410. Merely by way of example, execution of the sequences of instructions contained in the working memory 1414 may cause the processor(s) 1404 to perform one or more procedures of the methods described herein.

The terms "machine-readable medium" and "computer-readable medium," as used herein, may refer to any medium that participates in providing data that causes a machine to operate in a specific fashion. In an embodiment implemented using the computer device 1400, various computer-readable media might be involved in providing instructions/code to processor(s) 1404 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1410. Volatile media may include, without limitation, dynamic memory, such as the working memory 1414.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1404 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1400.

The communications subsystem 1412 (and/or components thereof) generally will receive signals, and the bus 1402 then might carry the signals (and/or the data, instructions, etc. carried by the signals) to the working memory 1414, from which the processor(s) 1404 retrieves and executes the instructions. The instructions received by the working memory 1414 may optionally be stored on a non-transitory storage device 1410 either before or after execution by the processor(s) 1404.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    scheduling a first user-initiated program recording timer to record a particular program broadcast on a particular television channel at a particular time by a television service provider;
    scheduling a second array program recording timer to record a plurality of programs broadcast consecutively over a time period including the particular time, on the same particular television channel by the television service provider;
    determining that the array program recording timer and the user-initiated program recording timer are both set to record the same particular program broadcast on the same articular television channel at the same particular time;
    outputting a programming guide including a descriptor of the particular program; and
    based on the determination that the array program recording timer and the user-initiated program recording timer are both set to record the particular program broadcast on the same particular television channel at the same particular time, outputting two different recording timer indicators on the programming guide in association with the descriptor of the particular program, a first graphical indicator that identifies scheduling of the first program recording timer, and a second graphical indicator that identifies scheduling of the second array program recording timer.

2. The method of claim 1, further comprising storing, in response to activation of the second array program recording timer, an omnibus channel file containing the plurality of programs broadcast consecutively on the television channel.

3. The method of claim 2, further comprising selecting the omnibus channel file for deletion after passage of a predetermined period of time following completion of storing of the omnibus channel file.

4. The method of claim 3, further comprising storing, prior to deletion of the omnibus channel file, a copy of a portion of the omnibus channel file that corresponds to the particular program.

5. The method of claim 4, further comprising deleting the omnibus channel file following completion of storing of the copy of the portion of the omnibus channel file that corresponds to the particular program.

6. The method of claim 1, wherein at least a portion of the first graphical indicator exhibits coloring different than coloring of the second graphical indicator.

7. The method of claim 6, wherein coloring of the second graphical indicator is associated with a particular profile of a customer account of the television service provider.

8. The method of claim 6, wherein coloring of the second graphical indicator is associated with a particular tuner to be used for recording.

9. The method of claim 1, wherein a geometric shape of the first graphical indicator is different than a geometric shape of the second graphical indicator.

10. The method of claim 1, wherein a geometric size of the first graphical indicator is different than the second graphical indicator.

11. The method of claim 1, wherein the first graphical indicator exhibits a symbol different than a symbol of the second graphical indicator.

12. The method of claim 1, wherein the first graphical indicator and the second graphical indicator are positioned within the programming guide adjacent the descriptor of the particular program.

13. A system, comprising:
one or more processors; and
a memory communicatively coupled with and readable by the one or more processors and having stored therein processor-readable instructions which, when executed by the one or more processors, cause the one or more processors to:
store a first user-initiated program recording timer to record a particular program broadcast on a particular television channel at a particular time by a television service provider;
store a second array program recording timer to record a plurality of programs broadcast consecutively over a time period including the particular time, on the particular television channel by the television service provider;
determine that the array program recording timer and the user-initiated program recording timer are both set to record the same particular program broadcast on the same particular television channel at the same particular time;
output a programming guide including a descriptor of the particular program; and
based on the determination that the array program recording timer and the user-initiated program recording timer are both set to record the particular program broadcast on the same particular television channel at the same particular time, output two different recording timer indicators on the programming guide in association with the descriptor of the particular program, a first graphical indicator that identifies scheduling of the first program recording timer, and a second graphical indicator that identifies scheduling of the second program recording timer.

14. The system of claim 13, further comprising:
a digital video recorder (DVR) database including a plurality of separate storage arrangements, including at least a first user-assigned storage arrangement and a second channel array storage arrangement; and
a content management engine configured to manage the plurality of separate storage arrangements, wherein the content management engine is configured to store television programs recorded via user-initiated program recording timers within the first user-assigned storage arrangement, and to store television programs recorded via array program recording timers within the second channel array storage arrangement.

15. The system of claim 14, wherein the first user-assigned storage arrangement and the second channel array storage arrangement correspond to separate storage partitions stored on a same storage device.

16. The system of claim 14, wherein the first user-assigned storage arrangement and the second channel array storage arrangement correspond to separate storage partitions stored on separate storage devices.

17. The system of claim 14, the memory having stored therein further processor-readable instructions which, when executed by the one or more processors, cause the one or more processors to:
in response to determining that the array program recording timer and the user-initiated program recording timer are both set to record the same particular program broadcast on the same particular television channel at the same particular time:
activate the second array program recording timer at the particular time, to record the particular program; and
store the particular program within an omnibus channel file in the second channel array storage arrangement, wherein the particular program is not stored in the first user-assigned storage arrangement.

18. The system of claim 17, wherein storing the particular program in the second channel array storage arrangement comprises setting a flag corresponding to the particular program within a catalog database, the flag indicating that the particular program is to be saved when the omnibus channel file is deleted from the channel array storage arrangement.

19. The system of claim 18, the memory having stored therein further processor-readable instructions which, when executed by the one or more processors, cause the one or more processors to:
delete the omnibus channel file from the channel array storage arrangement following a predetermined period of time; and
prior to the deleting the omnibus channel file from the channel array storage arrangement:
identify the flag corresponding to the particular program; and
transfer the particular program to the first user-assigned storage arrangement, based on the identification of the flag.

20. A non-transitory processor-readable medium comprising processor-readable instructions configured to cause one or more processors to:
store a first user-initiated program recording timer to record a particular program broadcast on a particular television channel at a particular time by a television service provider;
store a second array program recording timer to record a plurality of programs broadcast consecutively over a time period including the particular time, on the particular television channel by the television service provider;
determine that the array program recording timer and the user-initiated program recording timer are both set to record the same particular program broadcast on the same particular television channel at the same particular time;
output a programming guide including a descriptor of the particular program; and
based on the determination that the array program recording timer and the user-initiated program recording timer are both set to record the particular program broadcast on the same particular television channel at the same particular time, output two different recording timer indicators on the programming guide in association with the descriptor of the particular program, a first graphical indicator that identifies scheduling of the first program recording timer, and a second graphical indicator that identifies scheduling of the second program recording timer.

\* \* \* \* \*